United States Patent [19]
Harada et al.

[11] Patent Number: 5,865,453
[45] Date of Patent: Feb. 2, 1999

[54] VEHICLE HEIGHT ADJUSTING SUSPENSION INCLUDING DIFFERENTIAL PRESSURE VALVE

[75] Inventors: Kenji Harada; Hirohiko Morikawa; Tomomasa Yoshida, all of Toyota, Japan

[73] Assignee: Toyota Jidosha Kabushiki Kaisha, Toyota, Japan

[21] Appl. No.: 867,722

[22] Filed: Jun. 3, 1997

[30] Foreign Application Priority Data

Jun. 7, 1996 [JP] Japan .................................... 8-168251

[51] Int. Cl.[6] ................................................... B60G 17/08
[52] U.S. Cl. ............................ 280/124.161; 280/124.159; 280/6.157
[58] Field of Search ...................... 280/124.16, 124.161, 280/124.159, 6.157, 6.159, 5.514; 267/64.16

[56] References Cited

U.S. PATENT DOCUMENTS

| | | | |
|---|---|---|---|
| 3,558,153 | 1/1971 | Strauff | 280/124.159 |
| 4,030,777 | 6/1977 | Rabenseifner | 280/6.157 |
| 5,054,808 | 10/1991 | Tsukamoto | 280/124.161 |
| 5,288,102 | 2/1994 | Machida et al. | 280/124.159 |

FOREIGN PATENT DOCUMENTS 4108023A  4/1992  Japan .

*Primary Examiner*—Peter C. English
*Attorney, Agent, or Firm*—Kenyon & Kenyon

[57] ABSTRACT

When oil is discharged from an actuator 11*i* for lowering a vehicle height, an actuator pressure Pa is higher than a pump pressure Pp so that a differential pressure valve 41 slides its valving element 42 to the left by a pressure difference. A valving element seal portion 42*b*, abutted against a seat face 43*a* closing an opening of a lower return conduit 40*b*, moves from seat face 43*a* and open to lower return conduit 40*b*. As a result, the closure of the connected portion in the lower return conduit 40*b* is opened. Thus, the passage of a return conduit 40 is opened. Then, the oil from the actuator 11*i* is discharged via the return conduit 40 to the reserve tank 16 while receiving less flow resistance by avoiding a passage through any solenoid valve.

18 Claims, 8 Drawing Sheets to the Atmosphere

10D

VEHICLE HEIGHT ADJUSTING SUSPENSION INCLUDING DIFFERENTIAL PRESSURE VALVE

BACKGROUND OF THE INVENTION

1. Field of the Invention

The present invention relates to an actuator drive system for driving an extendible actuator by controlling the supply and the discharge of a working fluid to and from the actuator, and a suspension apparatus for suspending a vehicle body using the actuator interposed between the vehicle body and respective wheels and for adjusting a vehicle height by controlling supply and discharge of the working fluid.

2. Description of Prior Art

The actuator of this kind is used in various fields. In a vehicle, for example, actuators are used for suspending the vehicle body in a suspension apparatus where the actuators are interposed between the vehicle body and respective wheels (as disclosed in JAPANESE PATENT LAYING-OPEN GAZETTE No. 4-108023). The suspension apparatus of this kind, which controls the supply and discharge a working fluid to and from actuators in order to adjust the vehicle height, are discussed below. For example, when a vehicle reaches a speed of 80 km/h or faster, the suspension apparatus lowers the vehicle height from a standard level used when driving at an ordinary-speed to ensure driving stability. The suspension apparatus also works to keep the vehicle height at a fixed level suitable for the driving condition, irrespective of a variation in the number of passengers or the weight of loading. The suspension apparatus can also lowers the vehicle height from the standard level at a standstill condition in order to enable a driver and passengers to easily ride on or get off the vehicle. The suspension apparatus may be provided with a switch that arbitrarily changes the vehicle height between a high level and a low level. The vehicle height can be lowered or raised responsive to an operation of the switch. In any of these cases, various control valves in a hydraulic circuit of the apparatus are controlled to extend and contract the actuators so that the vehicle height at that moment (hereinafter referred to as the current vehicle height) equals a target vehicle height.

With the aforementioned various advantages, however, it has been pointed out that the suspension apparatus of the prior art has the following problems.

In the aforementioned JAPANESE PATENT LAYING-OPEN GAZETTE No. 4-108023, as shown in FIG. 11, a hydraulic circuit including actuators for respective wheels is usually equipped in a passage from a hydraulic pump 700 with a check valve 703 and a two-port and two-position switching solenoid valve 708. This switching solenoid valve 708 is controlled to take a first position to close the passage when the actuators are extended to raise the vehicle height, so that the oil can be pumped from the hydraulic pump 700 to the actuators. When the actuators are contracted to lower the vehicle height, on the other hand, the solenoid valve 708 is controlled to take a second position to open the passage so that the oil, as discharged from the actuators, is discharged together with its upstream check valve 703 into a reserve tank 711.

Incidentally, the solenoid valve 708 for switching the closure/opening of the passage has a spool for forming an oil passage therein, which is moved by a solenoid. The internal oil passage of the spool functions as an orifice through which the working fluid passes when the oil is discharged from the actuators to lower the vehicle height. A pressure loss is caused at the passing time through the orifice, and the orifice acts as a flow resistance to lower the flow rate thereby to reduce the discharging rate of the oil from the actuator. In the suspension apparatus, the lowering rate of the vehicle height is reduced during high speed driving, at standstill, or at the time of setting the vehicle height to the lower level. Therefore, it takes a long time to adjust the vehicle height.

In this case, the orifice in the solenoid valve 708 may be expanded, that is, the spool may be enlarged to expand the internal oil passage to increase the passing rate of the working fluid when the vehicle height is to be lowered. This expansion would enlarge the size of the solenoid valve by there deteriorating the load-ability and the handling.

In a apparatus other than the suspension apparatus, too, the discharging rate of the oil from the actuator will occur to invite the resultant problems.

SUMMARY OF THE INVENTION

The present invention has been conceived to solve the above-specified problems and has an object to increase the flow rate of discharging the oil (or working fluid) from the actuator.

Another object of the present invention is to provide a suspension apparatus using the actuator, which can lower the vehicle height promptly at the time of adjusting the lowering of the vehicle height.

In order to achieve these objects, according to a first aspect of the present invention, there is provided an actuator drive system for extending and contracting an actuator by controlling supply and discharge of a working fluid to and from the actuator, comprising:

a fluid source for pumping the working fluid;

a supply conduit for supplying the working fluid from the fluid source to the actuator;

a return conduit for discharging the working fluid discharged from the actuator; and a differential pressure valve including a valve chamber and a valving element slidably fit in the valve chamber, the differential pressure valve being receptive of a pump pressure of the side of the fluid source from the supply conduit at the valving element in the valve chamber and an actuator pressure of the side of the actuator from the return conduit at the valving element in the valve chamber so that the valving element in the valve chamber may be moved responsive to a pressure difference between the pump pressure and the actuator pressure across the valving element, wherein the return conduit includes: a first conduit portion for introducing the working fluid discharged from the actuator into the valve chamber so that the actuator pressure may be received by the valving element; and as a second conduit portion connected to the valve chamber for discharging the working fluid, as having passed through the first conduit portion via the valve chamber, and wherein the valving element is moved in the valve chamber responsive to the pressure difference to close the connected portion of the second conduit portion of the return conduit in the valve chamber, while the working fluid is being pumped from the fluid source through the supply conduit to the actuator, and to release the closure of the connected portion while the working fluid is being discharged from the actuator through the return conduit.

In the actuator drive system having the aforementioned construction according to the first aspect of the present invention, when the working fluid is pumped from the fluid source to the actuator, the differential pressure valve, as made receptive of the pump pressure and the actuator pressure, moves the valving element in the valve chamber responsive to the pressure difference so that the connected portion of the second conduit portion of the return conduit in the valve chamber is closed by the valving element. As a result, the working fluid, as pumped from the fluid source, is supplied to the actuator without flowing into the second conduit portion of the return conduit. When the working fluid is discharged from the actuator, on the other hand, the differential pressure valve is caused by the pressure difference at this time to move the valving element in the valve chamber thereby to release the closure of the connected portion of the second conduit portion of the return conduit in the valve chamber by that valving element. As a result, the working fluid, as discharged from the actuator, is discharged via the second conduit portion of the return conduit, as released and opened from the closure of the connected portion by the valving element.

As a result, the working fluid is exposed, while passing via the return conduit, to the less flow resistance which is reduced to an extent corresponding to the absence of the solenoid valve of the prior art in the return conduit. As a result, the passing rate is made higher than that of the prior art. According to this actuator drive system of the first aspect, therefore, the discharging rate of the working fluid from the actuator can be increased to raise the driving rate of the actuator according to the discharge of the working fluid. When the passage and non-passage of the working fluid through the return conduit are switched, this switching can be mechanically effected by the pressure difference between the pump pressure and the actuator pressure without any solenoid valve electrically driven. According to this actuator drive system of the first aspect, the electric control devices and their controls can be dispensed with to simplify the construction and to lower the cost.

When the working fluid is to be positively discharged from the actuator, the fluid source may preferably be stopped to lower the pump pressure in advance. Incidentally, if the actuator pressure overcomes the pump pressure by an unexpected accidental, the closure of the connected portion of the second conduit portion of the return conduit is released by the differential pressure valve so that the working fluid is discharged from the actuator via the second conduit portion of the return conduit.

In order to solve the above-specified problems, moreover, according to a second aspect of the present invention, there is provided an actuator drive system for extending and contracting an actuator by controlling supply and discharge of a working fluid to and from the actuator, comprising:

a fluid source for pumping the working fluid;

a first conduit connected to the actuator for conveying the working fluid to and from the actuator;

a second conduit connected to the fluid source, the second conduit also being connected to the first conduit through a connection path;

a differential pressure valve including a valve chamber and a valving element slidably fit in the valve chamber, the differential pressure valve being receptive of a pump pressure from the second conduit at a first side of the valving element in the valve chamber and an actuator pressure of the side of the actuator from the first conduit at a second side of the valving element in the valve chamber so that the valving element is moved responsive to a pressure difference between the pump pressure and the actuator pressure across the valving element, and a third conduit connected to the valve chamber at the second side of the valving element for conveying the working fluid discharged from the actuator, wherein the valving element is moved in the valve chamber responsive to the pressure difference to close the third conduit while the working fluid is being pumped from the fluid source through the second and first conduits to the actuator, and to open the third conduit while the working fluid is being discharged from the actuator through the first and third conduits.

In the actuator drive system having the aforementioned construction according to the second aspect of the present invention, when the working fluid is to be pumped from the fluid source to the actuator, the differential pressure valve, as made receptive of the pump pressure and the actuator pressure, moves the valving element in the valve chamber responsive to the pressure difference. So that, the third conduit portion is closed by the valving element. As a result, the working fluid, as pumped from the fluid source, is supplied to the actuator through the second and first conduits via the connection path. When the working fluid is discharged from the actuator, on the other hand, the differential pressure valve moves the valving element in the valve chamber responsive to the pressure difference at this time. So that, the third conduit is opened by that valving element. As a result, the working fluid, as discharged from the actuator, is discharged via the third conduit which is closed and opened by the valving element.

As a result, the working fluid is exposed, while passing via the return conduit, to the less flow resistance which is reduced to an extent corresponding to the absence of the solenoid valve of the prior art in the return conduit. As a result, the passing rate is made higher than that of the prior art. According to this actuator drive system of the second aspect, therefore, the discharging rate of the working fluid from the actuator can be increased to raised the driving rate of the actuator according to the discharge of the working fluid. When the passage and non-passage of the working fluid discharge from actuator are to be switched, this switching can be mechanically effected by the pressure difference between the pump pressure and the actuator pressure without any solenoid valve to be electrically driven. According to this actuator drive system of the second aspect, therefore, the electric control devices and their controls can be dispensed with to simplify the construction and to lower the cost.

When the working fluid is to be positively discharged from the actuator, the fluid source may preferably be stopped to lower the pump pressure in advance. Incidentally, if the actuator pressure overcomes the pump pressure by an unexpected accidental cause although the fluid source is not stopped, the third conduit is opened by the differential pressure valve so that the working fluid is discharged from the actuator via the third conduit.

The actuator drive system having the aforementioned construction according to the second aspect can take the following modes.

According to a first mode: the actuator drive system to further comprises a fourth conduit, as the connection path, connected between the first and second conduits.

And according to a second mode: the differential pressure valve includes passing means as the connection path for passing the working fluid through the valving element and the valve chamber from the second conduit to the first conduit, while the working fluid is being pumped from the fluid source, and for adding a pressure loss while the working fluid pumped from the fluid source is flowing out of the valve chamber.

In this actuator drive system according to the second mode, while the working fluid is being pumped from the fluid source, the working fluid passes through the valving element and the valve chamber from the second conduit to the first conduit, and the pressure loss caused while the working fluid is flowing out of the valve chamber. So that, while the working fluid is being pumped from the fluid source, therefore, the actuator pressure is always made lower than the pump pressure by the pressure loss to be caused by the differential pressure valve. The pressure difference for moving the valving element of the differential pressure valve can be established by the differential pressure valve itself. According to this actuator drive system of the second mode, therefore, the conduit leading from the fluid source to the actuator need not be equipped with another device such as a check valve or an orifice for establishing the pressure difference for moving the valving element of the differential pressure valve, so that the construction can be simplified to lower the cost. At the same time, the size of the system can be reduced.

In this actuator drive system of the second mode, moreover, the passing means comprises an in-valve path having a restrictive mechanism for adding the pressure loss to allow the working fluid to pass through the restrictive mechanism while the working fluid from the second conduit into the valve chamber is passing.

In this actuator drive system of a third mode, while the working fluid is passing through the in-valve path of the valving element, the pressure loss can be easily caused by the restrictive mechanism to establish the pressure difference for moving the valving element. According to this actuator drive system of the third mode, therefore, the pressure difference can be easily established by the restrictive mechanism without requiring any other device, so that the construction can be far more simplified to lower the cost.

In this case, the restrictive mechanism can be exemplified by an orifice or a slender, simple passage of a small diameter formed in the valving element.

In the aforementioned actuator drive system of the second aspect, the third conduit is connected to the end portion of the valve chamber at the second side, wherein the valve chamber includes a seat face formed with a slope at the connected portion of the third conduit and having an opening open to the third conduit, and wherein the valving element includes:
    a first valving element so movably fitted in the valve chamber as to move in the valve chamber responsive to the pressure difference; and
    a second valving element having a spherical shape and arranged between the first valving element and the seat face for closing the opening when the second valving element contacts with the seat face.

In this actuator drive system of a fourth mode, when the third conduit is to be closed by the valving element, the first valving element is moved in the valve chamber responsive to the pressure difference. Moreover, the spherical second valving element is pushed to abut against the seat face of the connected portion thereby by the first valving element, the opening of the third conduit is closed. Thus, the first valving element is required to have only the accuracy for moving in the valve chamber responsive to the pressure difference, and the second valving element is required to have only the accuracy for closing the opening by abutting against the seat face, so that the first and second valving elements need not be aligned. According to this actuator drive system of the fourth mode, therefore, the machining and assembling accuracy of the first and second valving elements can be simplified to simplify the machining and assembling steps thereby to lower the cost.

In the aforementioned actuator drive system of the fourth mode, the differential pressure valve includes means for applying a force to the second valving element away from the seat face.

In this actuator drive system of a fifth mode, the actuator pressure overcomes the pump pressure so that the first valving element moves apart from the second valving element. When the force, as applied from the first valving element to urge the second valving element onto the seat face, is released, the second valving element is moved away from the seat face without fail. The actuator pressure overcomes the pump pressure only when the working fluid is discharged from the actuator. At the time of discharging the working fluid from the actuator, therefore, the third conduit can be reliably opened to release the working fluid promptly. Thus, it is possible to increase the driving rate of the actuator in accordance with the discharge of the working fluid.

In the aforementioned actuator drive system of the second aspect, there are further comprised:
    a fifth conduit connected to the valve chamber at the first side of the valving element for discharging the working fluid from the valve chamber;
    a restrictor arranged in the second conduit; and
    relief means arranged in the fifth conduit for opening the same when the pressure of the working fluid passing through the fifth conduit exceeds a predetermined level.

In this actuator drive system of a sixth mode, when the pumping pressure of the working fluid from the fluid source exceeds a predetermined level, the fifth conduit is opened by the relief means to release the working fluid from the fifth conduit. In the fifth conduit, therefore, the pressure in the conduit drops as the conduit is opened. In the second conduit for exposing the differential pressure valve to the pumping pressure, the pressure in the conduit also drops downstream of the restrictor arranged in the conduit, in accordance with the discharge of the working fluid from the fifth conduit. On the other hand, the actuator pressure will not drop. As a result, the differential pressure valve is exposed to both the lowered pump pressure and the not-lowered actuator pressure to that it is caused by the pressure difference to move the valving element in the valve chamber so as to open the third conduit. As a result, the third conduit can be opened to release the working fluid at the side of the actuator.

When the pumping pressure of the working fluid from the fluid source exceeds a predetermined level, the actuator pressure grows higher than the ordinary level. Since the third conduit is opened, however, the working fluid at the actuator side is also discharged from the third conduit so that the actuator pressure drops. Moreover, this discharge of the working fluid is promptly effected because it is not exposed to the flow resistance, as described above, while the working fluid is passing through the third conduit. According to this actuator drive system of the sixth mode, therefore, when the pumping pressure of the working fluid from the fluid source exceeds the predetermined level, the actuator pressure, as raised accordingly, can be quickly lowered to avoid the troubles accompanying the rise in the actuator pressure, such as the leakage of the working fluid from the conduits.

If, in this case, the pumping pressure of the working fluid from the fluid source becomes lower than the predetermined level and restores the normal pumping pressure, the relief means closes the fifth conduit, and the differential pressure valve receives both the normal pumping pressure and the aforementioned lowered actuator pressure so that it is caused by the pressure difference to move the valving element thereby to close the third conduit. As a result, the working fluid, as pumped from the fluid source, is supplied to the actuator without flowing into the third conduit, so that the actuator pressure also quickly restores the normal level.

In the aforementioned actuator drive system of the second aspect: the valving element comprises a first portion for receiving the pump pressure and a second portion for receiving the actuator pressure, the second portion having a pressure receiving area smaller than that of the first portion; and wherein the valve chamber comprises a first sub-chamber for water-tightly housing the first portion, a second sub-chamber for water-tightly housing the second portion, and a third sub-chamber being water-tightly separated from the first and second sub-chambers by the first and second portions and vented to the atmosphere.

In this actuator drive system of a seventh mode, the first and second valving elements and first and second valve sub-chambers are given the larger and smaller areas for receiving the two pressures, and third sub-chamber can release and introduce the atmosphere. When the valving element is moved to close the third conduit, the valving element can be slid by applying a strong force to the valving element from the side of the first valve sub-chamber having the larger pressure receiving area toward the second valve sub-chamber. As a result, the third conduit can be reliably closed without exerting any load upon the fluid source for sliding the valving element. When the valving element is moved to open the third conduit, on the other hand, the atmosphere is vented through the third sub-chamber the capacity of which is increased by the first valving element to slide apart from the second valve sub-chamber, so that the sliding motion of the valving element in the valve chamber is not obstructed. As a result, the third conduit can be reliably opened by the sliding motion of the valving element to release the working fluid promptly from the actuator. Thus, it is possible to increase the driving rate of the actuator in accordance with the discharge of the working fluid.

In order to solve the above-specified problems, moreover, according to a third aspect of the present invention, there is provided a third aspect of the present invention, there is provided a suspension apparatus for interposing actuators between a vehicle body and respective wheels for suspending the vehicle body and respective wheels for suspending the vehicle body and adjusting a vehicle height by extending and contracting the actuators through the supply and discharge of a working fluid to and from the actuators, the suspension apparatus comprising:

a fluid source for pumping the working fluid;

a supply conduit for supplying the working fluid from the fluid source to the actuators;

a return conduit for discharging the working fluid discharged from the actuators; and a differential pressure valve including a valve chamber and a valving element slidably fit in the valve chamber, the differential pressure valve being receptive of a pump pressure of the side of the fluid source from the supply conduit at the valving element in the valve chamber and an actuator pressure of the side of the actuators from the return conduit at the valving element in the valve chamber so that the valving element in the valve chamber may be moved by a pressure difference between the pump pressure and the actuator pressure across the valving element, wherein the return conduit includes: a first conduit portion for introducing the working fluid discharged from the actuators into the valve chamber so that the actuator pressure may be received by the valving element; and second conduit portion connected to the valve chamber for discharging the working fluid, as having passed through the first conduit portion via the valve chamber, and wherein the valving element is moved in the valve chamber responsive to the pressure difference to close the connected portion of the second conduit portion of the return conduit in the valve chamber, while the working fluid is being pumped from the fluid source through the supply conduit to the actuators, and to release the closure of the connected portion while the working fluid is being discharged from the actuators through the return conduit.

In the suspension apparatus having the aforementioned construction according to the third aspect, when the working fluid is pumped from the fluid source to the actuators to raise the vehicle height, the connected portion of the second conduit portion of the return conduit is closed by the valving element of the differential pressure valve. As a result, the working fluid is pumped from the fluid source to the actuators to raise the vehicle height. When the vehicle height is lowered by discharging the working fluid from the actuators, on the other hand, the closure of the connected portion of the second conduit portion for the return conduit is released by the valving element of the differential pressure valve. The working fluid is discharged from the actuators via the return conduit which is opened by releasing the closure of the connected portion by the valving element.

As a result, the discharge of the working fluid from the actuators is effected, while passing through the return conduit, without receiving the flow resistance which is reduced to such an extent that the working fluid does not pass through the solenoid valve in the return conduit. According to this suspension apparatus of the third aspect, therefore, the vehicle height can be promptly lowered by increasing the discharging rate of the working fluid. Moreover, the passage and non-passage of the working fluid through the return conduit can be mechanically switched by the pressure difference between the pump pressure and the actuator pressure without requiring any solenoid valve to be electrically driven. According to this suspension apparatus of the third aspect, therefore, the electric control devices and their controls can be eliminated to simplify the construction and to lower the cost.

In order to solve the above-specified problems, moreover, according to a fourth aspect of the present invention, there is provided a suspension apparatus for interposing actuators between a vehicle body and respective wheels for suspending the vehicle body and adjusting a vehicle height by extending and contracting the actuators through the supply and discharge of a working fluid to and from the actuators, the suspension apparatus comprising:

a fluid source for pumping the working fluid;

a first conduit connected to the actuators for conveying the working fluid to and from the actuators;

a second conduit connected to the fluid source, the second conduit also being connected to the first conduit through a connection path;

a differential pressure valve including a valve chamber and a valving element slidably fit in the valve chamber, the differential pressure valve being receptive of a pump pressure from the second conduit at a first side of the valving element in the valve chamber and an actuator pressure of the side of the actuators from the first conduit at a second side of the valving element in the valve chamber so that the valving element is moved responsive to a pressure difference between the pump pressure and the actuator pressure across the valving element, and a third conduit connected to the valve chamber at the second side of the valving element for conveying the working fluid discharged from the actuators, wherein the valving element is moved in the valve chamber responsive to the pressure difference to close the third conduit while the working fluid is being pumped from the fluid source through the second and first conduits to the actuators, and to open the third conduit while the working fluid is being discharged from the actuators through the first and third conduits.

In the suspension apparatus having the aforementioned construction according to the fourth aspect of the present invention, when the working fluid is pumped from the fluid source to the actuators to raise the vehicle height, the third conduit is closed by the valving element of the differential pressure valve. As a result, the working fluid is pumped from the fluid source to the actuators to raise the vehicle height. When the vehicle height is lowered by discharging the working fluid from the actuators, on the other hand, the third conduit is opened by the valving element of the differential pressure valve. The working fluid is discharged from the actuators via the third conduit which is opened by the valving element.

As a result, the discharge of the working fluid from the actuators is effected, while passing through the third conduit, without receiving the flow resistance which is reduced to such an extent that the working fluid does not pass through the solenoid valve. According to this suspension apparatus of the fourth aspect, therefore, the vehicle height can be promptly lowered by increasing the discharging rate of the working fluid. Moreover, the passage and non-passage of the working fluid through the third conduit can be mechanically switched by the pressure difference between the pump pressure and the actuator pressure without requiring any solenoid valve to be electrically driven. According to this suspension apparatus of the fourth aspect, therefore, the electric control devices and their controls can be eliminated to simplify the construction and to lower the cost.

The suspension apparatus having the aforementioned construction according to the fourth aspect can take the following modes.

According to a first mode; the suspension apparatus to further comprises a fourth conduit, as the connection path, connected between the first and second conduits.

And according to a second mode: the differential pressure valve includes passing means as the connection path for passing the working fluid through the valving element and the valve chamber from the second conduit to the first conduit, while the working fluid is being pumped from the fluid source, and for adding a pressure loss while the working fluid pumped from the fluid source is flowing out of the valve chamber.

In this suspension apparatus of the second mode, while the working fluid is being pumped from the fluid source, the working fluid passes through the valving element and the valve chamber from the second conduit to the first conduit, and the pressure loss caused while the working fluid is flowing out of the valve chamber. So that, while the working fluid is being pumped from the fluid source, therefore, the actuator pressure is always made lower than the pump pressure by the pressure loss to be caused by the differential pressure valve. The pressure difference for moving the valving element of the differential pressure valve can be established by the differential pressure valve itself. According to this actuator drive system of the second mode, therefore, the conduit leading from the fluid source to the actuator need not be equipped with another device such as a check valve or an orifice for establishing the pressure difference for moving the valving element of the differential pressure valve, so that the construction can be simplified to lower the cost.

In this suspension apparatus of the second mode, moreover, the passing means comprises an in-valve path having a restrictive mechanism for adding the pressure loss to allow the working fluid to pass through the restrictive mechanism while the working fluid from the second conduit into the valve chamber is passing.

In this suspension apparatus of the third mode, while the working fluid is passing through the in-valve path of the valving element, the pressure loss can be easily caused by the restrictive mechanism to establish the pressure difference for moving the valving element. According to this suspension apparatus of the third mode, therefore, no device is required for establishing the pressure difference, and the pressure difference can be simply established by the restrictive mechanism so that the construction can be far more simplified to lower the cost.

In this case, the restrictive mechanism may be exemplified by an orifice or a slender, simple conduit having a small diameter and formed in the valving element.

In the aforementioned suspension apparatus according to the fourth aspect, the third conduit is connected to the end portion of the valve chamber at the second side, wherein the valve chamber includes a seat face formed with a slope at the connected portion of the third conduit and having an opening open to the third conduit, and wherein the valving element includes:
a first valving element so movably fitted in the valve chamber as to move in the valve chamber responsive to the pressure difference; and
a second valving element having a spherical shape and arranged between the first valving element and the seat face for closing the opening when the second valving element contacts with the seat face.

In this suspension apparatus of a fourth mode, when the third conduit is to be closed by the valving element, the first valving element is moved in the valve chamber responsive to the pressure difference. Moreover, the spherical second valving element is pushed to abut against the seat face of the connected portion thereby by the first valving element, the opening of the third conduit is closed. Thus, the first valving element is required to have only the accuracy for moving in the valve chamber responsive to the pressure difference, and the second valving element is required to have only the accuracy for closing the opening by abutting against the seat ace, so that the first and second valving elements need not be aligned. According to this suspension apparatus of the fourth mode, therefore, the machining and assembling accuracy of the first and second valving elements can be simplified to simplify the machining and assembling steps thereby to lower the cost.

In the aforementioned suspension apparatus of the fourth mode, the differential pressure valve includes means for applying a force to the second valving element away from the seat face.

In this suspension apparatus of a fifth mode, when the working fluid is discharged from the actuators so as to lower the vehicle height, the actuator pressure overcomes the pump pressure so that the first valving element moves apart from the second valving element. As a result, when the force, as applied from the first valving element to push the second valving element onto the seat face, is released, the second valving element is reliably moved apart from the seat face. According to this suspension apparatus of the fifth mode, therefore, when the working fluid is discharged from the actuators to lower the vehicle height, the third conduit can be reliably opened to release the working fluid quickly so that the lowering rate of the vehicle height according to the discharge of the working fluid can be increased to lower the vehicle height promptly.

In the aforementioned suspension apparatus according to the fourth aspect, there are further comprised:

a fifth conduit connected to the valve chamber at the first side of the valving element for discharging the working fluid from the valve chamber;

a restrictor arranged in the second conduit; and relief means arranged in the fifth conduit for opening the same when the pressure of the working fluid passing through the fifth conduit exceeds a predetermined level.

In this suspension apparatus of a sixth mode, when the pumping pressure of the working fluid from the fluid source exceeds the predetermined level, the fifth conduit is opened by the relief means to release the working fluid from the fifth conduit. In the fifth conduit, therefore, the pressure in the conduit is lowered by opening the conduit, and in the second conduit for causing the differential pressure valve to receive the pump pressure, the pressure in the conduit is also lowered downstream of the restrictor, as arranged in the conduit, in accordance with the discharge of the working fluid from the fifth conduit. On the other hand, the actuator pressure is not lowered. The differential pressure valve receives both the lowered pump pressure and the not-lowered actuator pressure so that the valving element is moved in the valve chamber by the pressure difference to open the third conduit. As a result, the third conduit can be opened to release the working fluid at the side of the actuator.

Incidentally, when the pump pressure of the working fluid from the fluid source exceeds the predetermined level, the actuator pressure grows higher than the ordinary level. Since the third conduit is opened, however, the working fluid at the actuator side is discharged from the third conduit so that the actuator pressure is also lowered. Moreover, this discharge of the working fluid id quickly effected because the working fluid does not receive the flow resistance while flowing through the third conduit. According to this suspension apparatus of the sixth mode, therefore, when the pump pressure of the working fluid from the fluid source exceeds the predetermined level, the raised actuator pressure can be quickly lowered to avoid the problems accompanying the rise in the actuator pressure such as the leakage of the working fluid or the unexpected rise in the vehicle height.

If, in this case, the pump pressure of the working fluid from the fluid source becomes lower than the predetermined level and restores the normal pump pressure, the relief means closes the fifth conduit, and the differential pressure valve receives both the normal pump pressure and the aforementioned lowered actuator pressure so that it is caused by the pressure difference to move the valving element thereby to close the third conduit. The working fluid, as pumped from the fluid source, is supplied to the actuators without flowing into the third conduit, so that the actuator pressure quickly restores the normal level. As a result, the vehicle height can also restores the normal value.

In the aforementioned suspension apparatus according to the fourth aspect: the valving element comprises a first portion for receiving the pump pressure and a second portion for receiving the actuator pressure, the second portion having a pressure receiving area smaller than that of the first portion; and wherein the valve chamber comprises a first sub-chamber for water-tightly housing the first portion, a second sub-chamber for water-tightly housing the second portion, and a third sub-chamber formed between the first and second sub-chambers, the third sub-chamber being water-tightly separated from the first and second sub-chambers by the first and second portions and vented to the atmosphere.

In this suspension apparatus of a seventh mode, the first and second valving elements and first and second valve sub-chambers are given the larger and smaller areas for receiving the two pressures, and third sub-chamber can release and introduce the atmosphere. When the valving element is moved to close the third conduit, the valving element can be slid by applying a strong force to the valving element from the side of the first valve sub-chamber having the larger pressure receiving area toward the second valve sub-chamber, and the air at the third sub-chamber, the capacity of which is reduced by the first valving element sliding to the second valve sub-chamber, is vented to the atmosphere without obstructing the sliding motion of the valving element in the valve chamber. As a result, the third conduit can be reliably closed without exerting any load upon the fluid source for sliding the valving element. When the valving element is moved to open the third conduit, on the other hand, the atmosphere is vented through the third sub-chamber the capacity of which is increased by the first valving element to slide apart from the second valve sub-chamber, so that the sliding motion of the valving element in the valve chamber is not obstructed. The third conduit can be reliably opened by sliding motion of the valving element to release the working fluid promptly from the actuators. As a result, the vehicle height can be promptly lowered.

Incidentally, if the fluid source is stopped to lower the pump pressure in advance when the valving element is moved to open the third conduit, the working fluid can be discharged more quickly from the actuators by sliding the valving element quickly to the first valve sub-chamber. Thus, the vehicle height can be promptly lowered.

DESCRIPTION OF THE PREFERRED EMBODIMENTS

Figure 1:
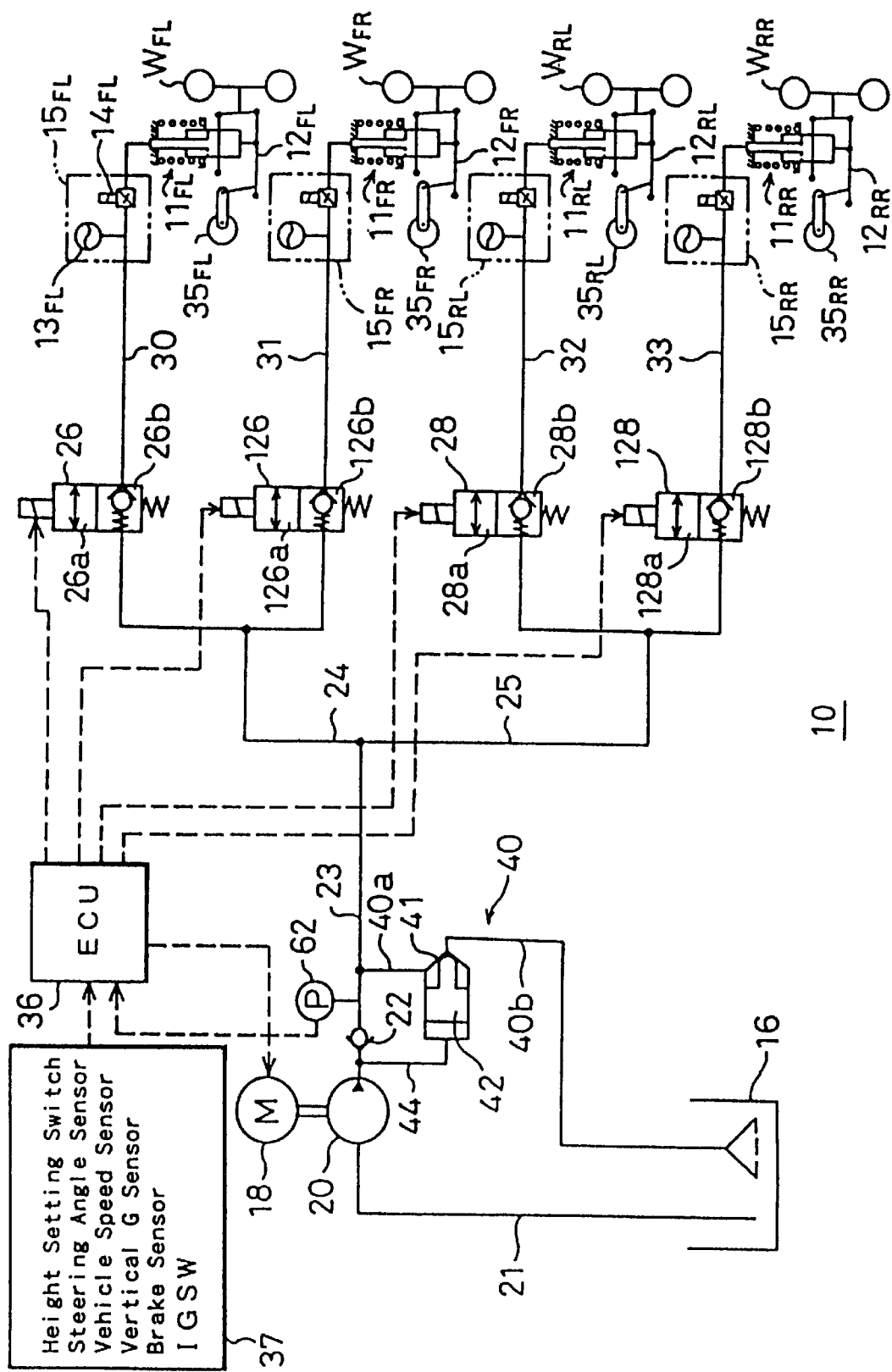
FIG. 1 is a schematic diagram showing a construction of a fluid circuit of a suspension apparatus 10, as exemplified by a hydraulic type suspension according to an embodiment.

Here will be described embodiments of a suspension apparatus according to the present invention. As shown in FIG. 1, a suspension apparatus 10 is constructed as a hydraulic suspension using a hydraulic cylinder in the following manner.

The suspension apparatus 10 is equipped with actuators 11*i* (11FL, 11FR, 11RL, 11RR) respectively for a left-hand front wheel WFL, a right-hand front wheel WFR, a left-hand rear wheel WRL and a right-hand rear wheel WRR. In the following description, the suffix i will represent an arbitrary one of the reference letters FL, FR, RL and RR corresponding to the respective wheels.

The actuator 11*i* is a kind of cylinder-piston unit, as interposed between a suspension member 12*i* supporting a corresponding wheel and a vehicle body (i.e., between each wheel and the vehicle body) for suspending the vehicle body. This actuator 11*i* vertically moves the piston every time, when a working fluid (e.g.,oil in the present embodiment) is supplied to and discharged from its working fluid chamber, thereby to change the vehicle height along the vertical axis at the corresponding wheel. Upstream of the conduit of this actuator 11*i*, there is disposed a damping force varying mechanism 15*i* which is composed of an accumulator 13*i* and a variable restrictor 14*i*, so that the actuator 11*i* can change the damping force of the vertical motion of the vehicle body.

The suspension apparatus 10 is equipped with a reserve tank 16 for reserving the oil which is to be supplied to and discharged from the actuator 11*i*.

The oil in the reserve tank 16 is sucked via a suction conduit 21 by a pump 20 to be driven by a motor 18, so that it is pumped to the downstream of the pump. From this pump 20, the oil is further supplied through a first check valve 22 via a main supply conduit 23 to a front wheel supply conduit 24 and a rear wheel supply conduit 25, as branched downward. The front wheel supply conduit 24 is further branched downstream into a left-hand front wheel conduit 30 and a right-hand front wheel conduit 31. The left-hand front wheel conduit 30 is equipped with a first front wheel control valve 26 for adjusting the vehicle height of the left-hand front wheel WFL, and the right-hand front wheel conduit 31 is equipped with a second front wheel control valve 126 for adjusting the vehicle height of the right-hand front wheel WFR. The rear wheel supply conduit 25 is also branched downstream into a left-hand rear wheel conduit 32 and a right-hand rear wheel conduit 33. The left-hand rear wheel conduit 32 is equipped with a first rear wheel control valve 28 for the left-hand rear wheel WRL, and the right-hand rear wheel conduit 33 is equipped with a second rear wheel control valve 128 for the right-hand rear wheel WRR.

The first front wheel control valve 26 is exemplified, as shown, by a two-position change-over valve for selectively taking a two-way communication position 26*a*, in which it allows the oil to pass between its upstream and down stream conduits in two ways, and a one-way communication position 26*b*, in which it blocks the passage of the oil from the side of the pump 20 but allows the oil to pass from the side of the actuator 11*i* if the oil pressure is higher than a predetermined level. Moreover, this first front wheel control valve 26 usually takes the one-way communication position 26*b*, as shown, and is switched to the two-way communication position 26*a* at the time of adjusting (i.e., raising/lowering) the vehicle height. Incidentally, this valve structure likewise applies to the second front wheel control valve 126 and the first and second rear wheel control valves 28 and 128.

Specifically, the first and second wheel control valves 26 and 126 and the first and second rear wheel control valves 28 and 128 do not allow the oil to pass from the actuator 11*i*, when the pressure upon the actuator 11*i* is lower than the normal internal pressure at the car lowering time, but allows the oil to flow from the actuator 11*i* only when a pressure higher than the normal internal pressure is applied to the actuator 11*i*. Thanks to this construction of the control valves, the first and second front wheel control valves 26 and 128 can be switched to their one-way communication positions to keep the vehicle height at this time. While the vehicle height is kept, these control valves are switched, and the motor 18 is stopped to stop the operation of the pump 20.

Thus, the oil, as having been pumped by the pump 20 to reach the front wheel supply conduit 24 and the rear wheel supply conduit 25 via the main supply conduit 23, passes through the first and second front wheel control valves 26 and 126 and the first and second rear wheel control valves 28 and 128, when these valves are switched from the shown one-way communication positions 26*b*, 126*b*, and 28*b* to the two-way communication positions 26*a*, 126*a*, 28*a* and 128*a*, until it is supplied to each actuator 11*i*. As a result, the vehicle height, as corresponding to the actuator 11*i* supplied with the oil, raises higher. In this case, the front wheel control valves and the rear wheel control valves are independently switched so that the vehicle height can be raised for the respective wheels.

Figure 2:
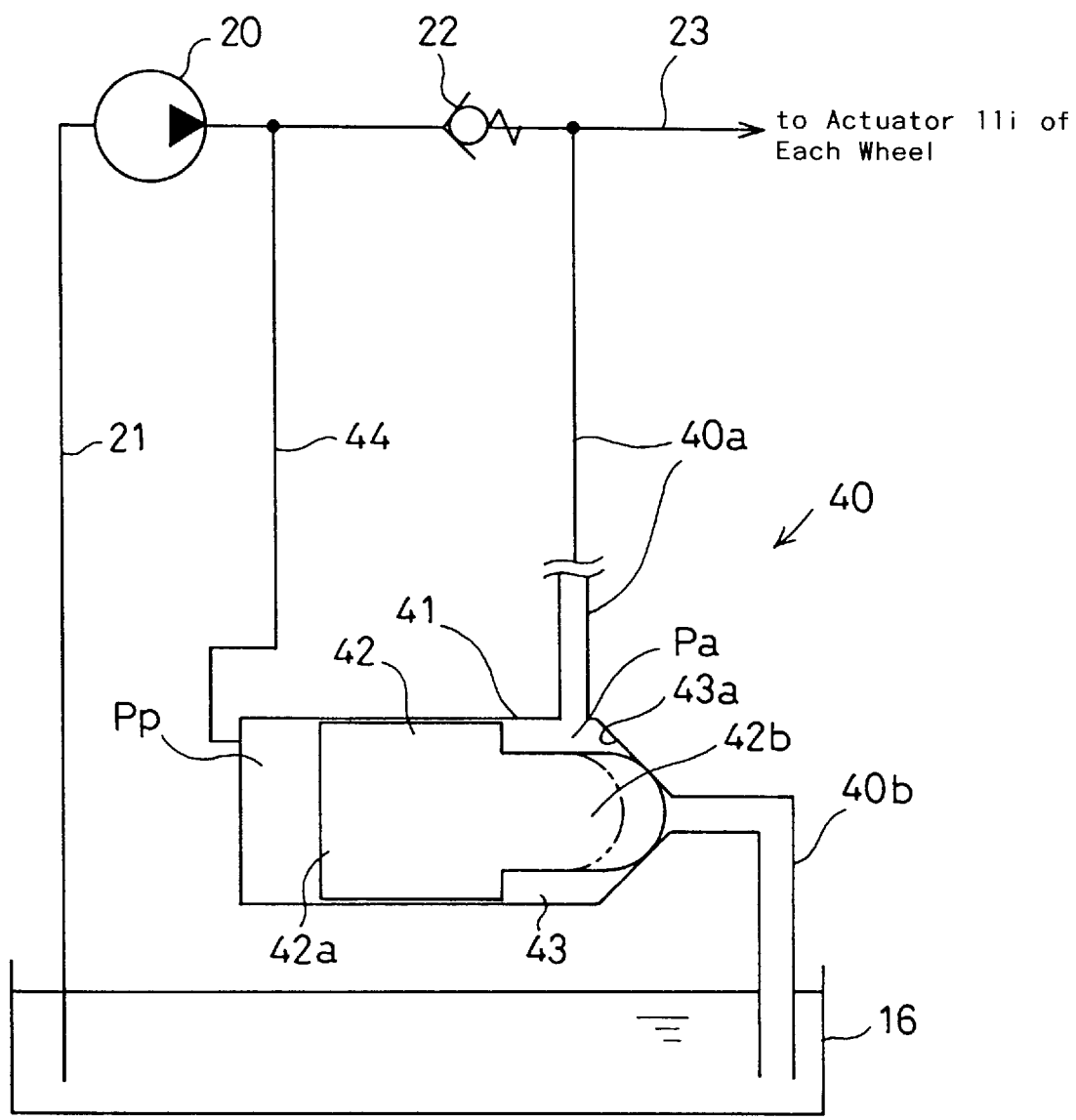
FIG. 2 is a schematic diagram showing an essential portion of the fluid circuit of FIG. 1 around a differential pressure valve 41.

The suspension apparatus 10 is equipped with a return conduit 40 which is branched from the main supply conduit 23 to the reserve tank 16 for discharging the oil from the actuator 11*i* to lower the vehicle height. The passage of this return conduit 40 is opened/closed by a differential pressure valve 41. FIG. 2 is an enlarged schematic diagram of the differential pressure valve 41. The differential pressure valve 41 is equipped with a valve chamber 43 and a valving element 42 slidably fit in the valve chamber 43. Moreover, the differential pressure valve 41 is arranged to connect the valve chamber 43 to a pump pressure introduction conduit 44, as branched upstream of the first check valve 22 from the main supply conduit 23, and the aforementioned return conduit 40.

The return conduit 40 is composed of an upper return conduit 40*a* branched downstream of the first check valve 22 from the main supply conduit 23, and a lower return conduit 40*b* leading to the reserve tank 16. Moreover, the upper return conduit 40*a* is connected to the right-hand end face of the valve chamber 43, and the lower return conduit 40*b* is connected to a seat face 43*a*, as formed at an inclination at the right-hand end of the valve chamber 43, at the recessed portion of the same. As a result, the differential pressure valve 41 receives both an oil pump pressure Pp, as supplied via the pump pressure introduction conduit 44 from the pump 20, and an actuator pressure Pa at the side of the actuator 11*i* via the upper return conduit 40*a*, at its valve chamber 43 across the valving element 42. In this differential pressure valve 41, therefore, the valving element 42 is moved in the valve chamber 43 to the right and left by the difference between the two pressures.

The valving element 42 is composed of a valving element body 42*a* to be exposed to the aforementioned two pressures, and a valving element seal portion 42*b* having a hemispherical leading end projection. This valving element 42 is constructed to close the connected portion of the lower return conduit 40*b* when the projection of the valving element seal portion 42*b* comes into abutment against the seat face 43*a*.

By the action of the differential pressure valve 41, the passage of the return conduit 40 is opened and closed in the following manner so that the oil is supplied to and discharged from the actuator 11*i* by the pump 20.

When the oil is pumped from the pump 20 to the actuator 11*i* to raise the vehicle height at the corresponding wheel, the pump pressure Pp is made higher than the actuator pressure Pa by the pressure loss caused by the first check valve 22. As a result, the difference between the two pressures moves the valving element 42 rightward to bring the hemispherical projection at the leading end of the valving element seal portion 42*b* into abutment against the seat face 43*a*. The connected portion of the lower return conduit 40*b* is shut so that the conduit of the return conduit 40 is closed.

Thus, the oil, as supplied from the pump 20, passes through the main supply conduit 23 without flowing into the lower return conduit 40*b* of the return conduit 40 but flows into the front wheel supply conduit 24 and the rear wheel supply conduit 25. At each wheel, moreover, the oil is supplied to the corresponding actuator 11*i* to raise the vehicle height after the position of the corresponding first and second front wheel control valves 26 and 126 or first and second rear wheel control valves 28 and 128 are switched from the one-way communication position 26*b* of the like to the two-way communication position 26*a* or the like.

In lowering the vehicle height, on the other hand, the pump pressure Pp upstream of the first check valve 22 is lowered by the stop of the pump 20 but the actuator pressure Pa downstream of the first check valve 22 is raised. The pressure difference moves the valving element 42 leftward so that the valving element seal portion 42*b* leaves the seat face 43*a*. As a result, the connected portion of the lower return conduit 40*b* is released from the closed state to open the passage of the return conduit 40. In this case, pump 20 stops before lowering the vehicle height so that the oil in the conduit upstream of the first check valve 22 is usually returned from pump 20 to the reserve tank 16 for the time period between the pump stopping and the vehicle height lowering. As a result, the pump pressure Pp in this case is substantially equal to the atmospheric pressure.

If the actuator pressure Pa is greater than the pump pressure Pp, oil is discharged from the actuator 11*i* of each wheel so that the discharged oil flows into the upper return conduit 40*a* of the return conduit 40 and passes through the valve chamber 43 at the side of the valving element seal portion 42*b* and further through the clearance between the seat face 43*a* and the leading end of the valving element seal portion 42*b*. After this, the oil flows from the connected portion of the lower return conduit 40*b* into the return conduit and passes through until it is recovered by (or released into) the reserve tank 16. Thus, the oil is discharged from the actuator 11*i* to lower the vehicle height. Incidentally, in this oil discharging case, too, the first and second front wheel control valves 26 and 126 and the rear wheel control valves 28 and 128 can be individually switched to lower the vehicle height at the respective wheels.

While the first front wheel control valve 26 or the like is taking the one-way communication position, the internal pressure of the actuator 11*i* may be abnormally raised to release the oil to the main supply conduit 23, as described above. In this case, the pressure relation of the actuator pressure Pa greater than the pump pressure Pp is brought about by an (abnormal) rise in the actuator pressure Pa so that the differential pressure valve 41 slides the valving element 42 leftward to release the closure of the connected portion of the lower return conduit 40*b* thereby to open the passage of the return conduit 40. If this abnormal situation occurs, the oil is promptly recovered via the return conduit 40 by the reserve tank 16.

As shown in FIG. 1, the suspension apparatus 10 is further equipped at each actuator 11*i* with a vehicle height sensor 35*i*. This height sensor 35*i* detects the vehicle height at each wheel to output a detection signal indicating the detected corresponding vehicle height hi to an electronic control unit (ECU) 36.

This ECU 36 is equipped with a microcomputer including a CPU, a ROM, a RAM and a timer. The ECU 36 fetched not only the signals from the height sensors 35*i* for the respective wheels, but also the signals form other sensors and switches including a steering angle sensor, a vehicle speed sensor, a vertical acceleration (or vertical G) sensor, a height setting switch, a brake sensor and an ignition switch (IGSW37), and the signal of a pressure sensor 62 for detecting the pressure of the main supply conduit 23. On the basis of these signals, the ECU 36 executes the vehicle height adjusting process to output the various drive signals necessary for the vehicle height adjustments to the first and second front wheel control valves 26 and 126 and the rear wheel control valves 28 and 128 and the motor 18. The ECU 36 is further electrically connected with the variable restrictor 14I of the damping force varying mechanism 15I, so that the damping force by the actuator 11*i* is changed by adjusting the restrictor opening ratio of the variable restrictor 14*i*.

In this case, the height setting switch is operated by the driver to set the level of the vehicle height to any of HIGH, NORMAL and LOW in accordance with the operated position and to output the level signal. The vehicle height to be set by this height setting switch is defined to be a standard level at which the vehicle height of the vehicle is desirably kept at the set level. Incidentally, the height setting switch can be modified to a switch for setting the vehicle height change mode. Then, if the HIGH mode is selected, the signal to be outputted can set the vehicle height to the HIGH level during an ordinary run and to the NORMAL level during a high speed run. If the NORMAL mode is selected, the signal to be outputted can set the vehicle height to the NORMAL level during the ordinary run and to the LOW level during the high speed run. In this modification, the standard vehicle height is determined to any of HIGH, NORMAL and LOW levels in accordance with the vehicle speed.

Next, the vehicle height adjusting process to be executed by the ECU 36 will be described with reference to the flow chart of FIG. 3.

Figure 3:
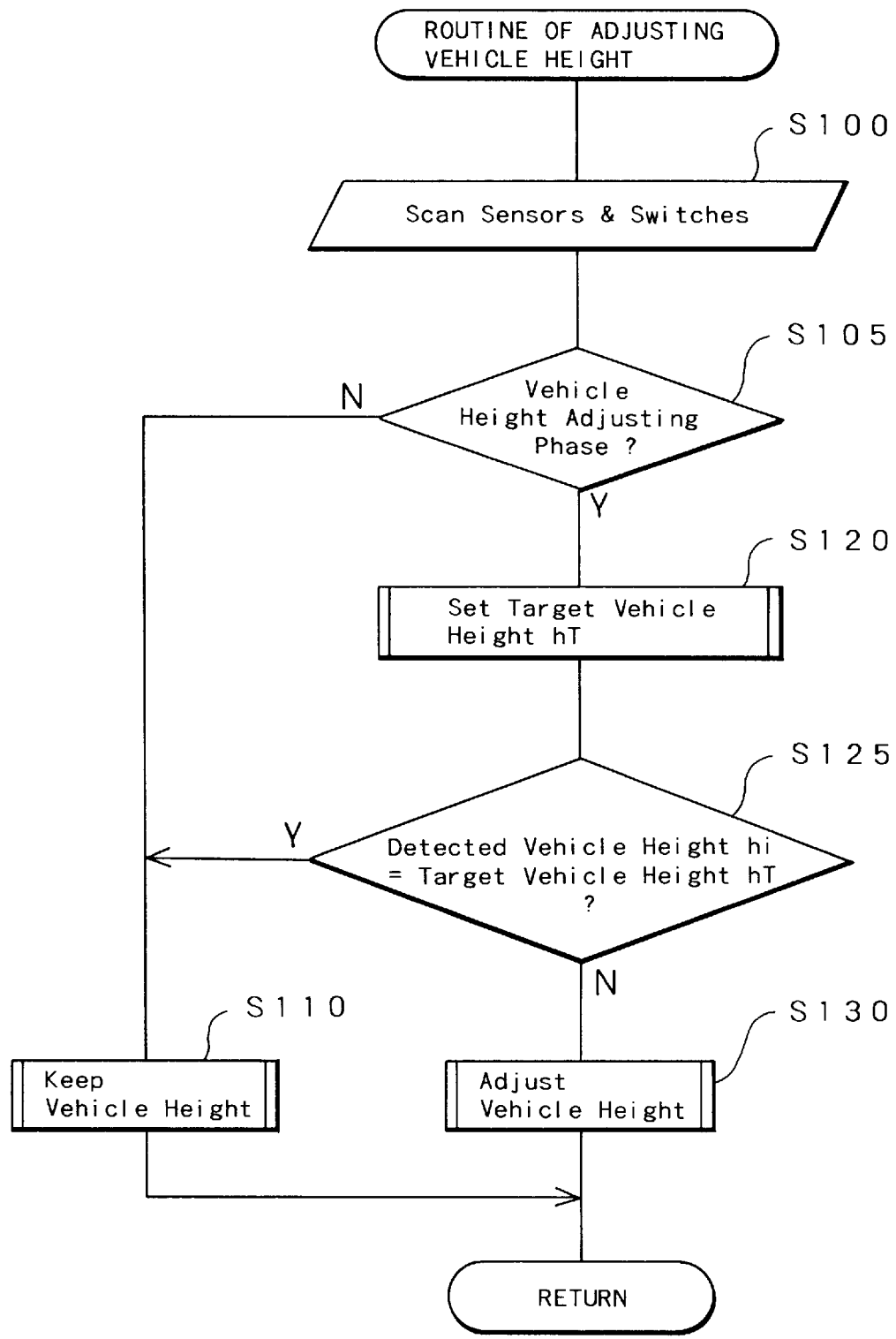
FIG. 3 is a flow chart showing a routine of adjusting the vehicle height to be executed by an ECU 36 of the suspension apparatus 10.

The flow chart of FIG. 3 is repeatedly executed for a predetermined time period immediately after the operation of the IGSW switch the so-called "initialization" is executed to clear the flags, as will be described hereinafter.

When this vehicle height adjusting process is started, the aforementioned various sensors and switches are scanned at first (at Step S100) to read the signals necessary for the vehicle height adjustment. The signals to be read at this Step S100 are not only the (detected) vehicle speed from the vehicle speed sensor and the detected vehicle height hi (i.e., the left-hand front wheel height hFL, and the right-hand rear wheel height hFR, the left-hand rear wheel height hRL and the right-hand rear wheel height hRR) from the height sensor 35i but also the signal indicative of the application or not of the foot brake from the brake switch, the (detected) steering angle from the steering angle sensor and the height setting signal from the height setting switch. Incidentally, the necessary signal processing (e.g., the calculation of the steering angle speed from the inputted steering angle) is executed in accordance with that scanning operation.

Subsequent to this sensor scanning, it is decided (at Step S105) on the basis of the read various signals whether or not the phase is for the height adjustment execution. Specifically, a serious rolling occurs in the vehicle if the vehicle is quickly turning or turning at a high speed. In this state, the height adjustment is not preferable for the driving stability. If, therefore, it is decided on the basis of the signal from the steering angle sensor that the answer to the height adjusting phase is NO, the height is kept (at Step S110) because no height adjustment is necessary. Specifically, the vehicle height is kept, as described above, by pumping the first and second front wheel control valves 26 and 126 and the rear wheel control valves 28 and 128 with the signals for switching their positions to the one-way communication positions 26b, 126b, 28b and 128b and by outputting the stop signal to stop the motor 18. After this, the operation from the Step S100 are repeated.

If the answer of Step S105 is YES, on the other hand, the target height hT or the target for the height adjustment is set (at Step S120) on the basis of the vehicle speed at that time and the height setting signal (e.g., the standard height hH) from (e.g., the standard height hH) from the height setting switch. Subsequently, it is decided (at Step S125) whether or not the detected height hi is equal to the target height hT. In this case, according to the present embodiment, the vehicle heights can be adjusted individually for the right and left front wheels and the for the right and left rear wheels. Therefore, the aforementioned decisions are made for the left and right front wheels by using the detected height hi and the average value of the left front wheel height hFL and the right front wheel height hi hFR and the average value of the left rear wheel height hRL and the right rear wheel height hRR. Incidentally, the decision that the detected height hi is equal to the target height hT is made when the detected height hi is within a predetermined range (i.e., the target height hT±3) around the target height hT.

If the answer of this Step S125 is YES, the routine transfers to the aforementioned Step S110, at which the vehicle height is kept, while deciding that the height adjustment is unnecessary. If the YES answer is made for the left and right front wheels only, for example, the vehicle heights are kept at the left and right front wheels, as decided.

If the answer of Step S125 is NO while deciding that the detected height hi is not equal to the target height hT, on the other hand, a height difference Δh between the target height hT and the detected height hi is calculated. The height adjustment is made (at Step S130) in the direction to eliminate the height difference Δh, that is, to equalize the detected height hit to the target height hT which has been set at Step S120. Incidentally, the height adjustment in this case is executed for the wheels (e.g., the left and right front wheels, the left and right rear wheels or all the wheels), as decided to be NO.

Here will be described in more detail the content of the height adjusting process. If the detected height hi is lower than the target height hT, the motor 18 is run, and the positions of the first front wheel control valve 26 and the rear wheel control valve 28 are switched to the two-way communication positions 26a and 28a by outputting the switch signals thereto. As a result, the oil is pumped by the pump 20 via the main supply conduit 23 to the individual actuators 11i so that the vehicle height is adjusted to rise, as described above. In this case, the time period for the first front wheel control valve 26 and the rear wheel control valve 28 to take the two-way communication positions 26a and 28a, that is, the amount of control for raising the heights is determined according to the height difference Δh, and a reference is made to the map which is stored in advance in the RAM in relation to the height difference Δh.

If the detected height hi is higher than the target height hT, on the other hand, the motor 18 is stopped to set the actuator pressure Pa>the pump pressure Pp, and the positions of the first and second rear wheel control valves 26 and 126 or the first and second rear wheel controls valves 28 and 128 are switched to the two-way communication positions 26a and so on by outputting the switch signals thereto. As a result, the differential pressure valve 41 releases the closure of the connected portion of the lower return conduit 40b, as described above, to open the passage of the return conduit 40 so that the oil, as discharged from the actuators 11i, is discharged via the return conduit 40 thereby to lower the vehicle height. In this case, the time period for the individual control valves for the front or rear wheels to take the two-way communication positions 26a and so on, that is, the amount of control for lowering the vehicle height is determined according to the aforementioned map and the height difference Δh.

In the suspension apparatus 10 of the present embodiment, as has been described above, when the oil is discharged for lowering the vehicle height from the actuator 11i, the motor 18 for driving the pump 20 is stopped to make the actuator pressure Pa higher than the pump pressure Pp, and the valving element 42 of the differential pressure valve 41 is so moved by the difference between the two pressures as to release the closure of the connected portion of the lower return conduit 40b thereby to open the passage of the return conduit 40. Then, the oil, as discharged from the actuator 11i, is recovered by the reserve tank 16 via the return conduit 40. In this case, while passing via the return conduit 40, the oil flows only via the upper return conduit 40a, through the valve chamber at the side of the valving element seal portion 42b, through the clearance between the seat face 43a and the leading end portion of the valving element seal portion 42b, and via the lower return conduit 40b, and no solenoid valve is present in the return pass unlike the prior art.

At the discharge from the actuator 11i, the oil does not receive the flow resistance which might otherwise be caused by the solenoid valve in the return conduit, so that its flow rate can be increased when it is discharged. Thus, according to the suspension apparatus 10 of the present embodiment, the lowering rate of the vehicle height can be increased by increasing the flow rate of the oil to pass through the return conduit 40 at the oil discharging time.

At the instant, moreover, when the oil flows from the upper return conduit 40a into the lower return conduit 40b, the clearance between the seat face 43a and the leading end portion of the valving element seal portion 42b is retained, and the effective passage area of the oil in the clearance can be easily made equal to or more than the effective area of the lower return conduit 40b by elongating the moving distance of the valving element 42. As a result, the oil can be reliably freed, when it passes through the clearance, from the flow resistance as with the solenoid valve, and the passage from the upper return conduit 40a to the lower return conduit 40b can be widened to increase the discharged flow rate of the oil. According to the suspension apparatus 10 of the present embodiment, therefore, the discharge rate of the oil can be reliably increased to improve the vehicle height lowering rate.

Moreover, the electrically driven solenoid valve can be dispensed with when the passage/non-passage of the oil is to be switched by closing/opening the passage of the return conduit 40. This switching of the passage/non-passage of the oil can be mechanically effected by using the differential pressure valve 41 which have the valving element 42 responding to the pressure difference between the pump pressure Pp and the actuator pressure Pa. According to this suspension apparatus 10, therefore, the solenoid valve for the vehicle height adjustment and its drive control can be eliminated to simplify the construction and to lower the cost.

According to the suspension apparatus 10 of the present embodiment, moreover, the main supply conduit 23 is branched into the front wheel supply conduit 24 and the rear wheel supply conduit 25 so that the height adjusting circuit is divided into the separate circuits for the front wheels and for the rear wheels. As a result, the vehicle height can naturally be quickly lowered not only for all the wheels of the vehicle, but also for the corresponding wheel or wheels such as the left and/or right front wheels only or the left and/or right rear wheels only.

Here will be described other embodiments. For these descriptions, the same members or members having the same actions as those of the suspension apparatus 10 of the foregoing embodiment will not be described, but assigned with the common reference numerals, and the description will be limited to the different constructions.

Figure 4:
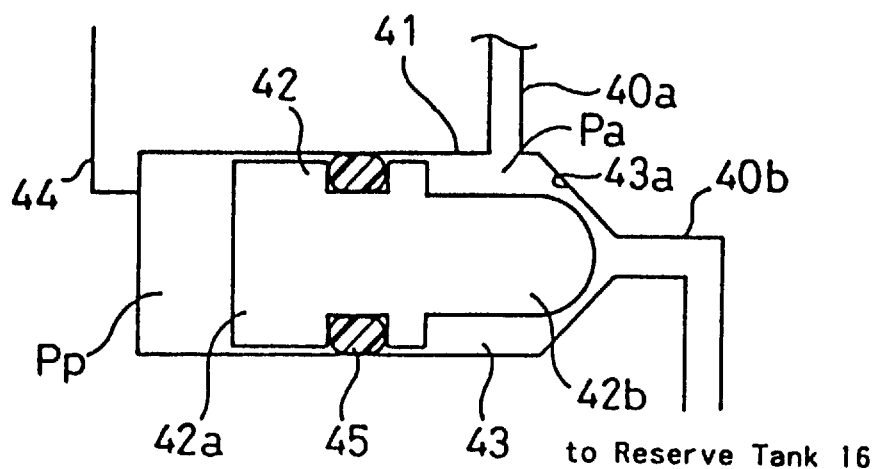
FIG. 4 is a schematic diagram showing a construction of the differential pressure valve 41 to be used in a suspension apparatus of a second embodiment.

In the suspension apparatus 10 of the second embodiment, as shown in FIG. 4, the differential pressure valve 41 is equipped in the outer circumference of the valving element body portion 42a of the valving element 42 with an O-ring 45 for enhancing the water-tightness between the valving element 42 and the valve chamber 43. As a result, the following advantages can be achieved by the suspension apparatus 10 of this second embodiment.

At the discharge of the oil from the actuator 11i, the pump 20 is stopped to make the actuator pressure Pa higher than the pump pressure Pp. If, in this case, the water-tightness between the valving element 42 and the valve chamber 43 is regulated exclusively by the difference in the sizing tolerance between these two machined members, the actuator pressure Pa is higher than the pump pressure Pp so that the oil in the valve chamber at the side of the valving element seal portion 42b might leak from the small clearance between the two members into the valve chamber at the side of the pump pressure introduction conduit 44. If, moreover, the return rate of the oil in the main supply conduit 23 upstream of the first check valve 22 to the reserve tank 16 at the stopping time of the pump 20 is slower than the aforementioned leaking rate of the oil, the pressure in the valve chamber at the side of the pump pressure introduction conduit 44 rises to approximate the actuator pressure Pa to some extent. This may disable the differential pressure valve 41 to slide the valving element 42 smoothly to the pump pressure introduction conduit 44 due to the pressure difference.

In the aforementioned suspension apparatus 10 of the second embodiment, however, the water-tightness between the valving element 42 and the valve chamber 43 can be enhanced by the O-ring 45 to avoid the aforementioned leakage of the oil. By the pressure difference between the actuator pressure Pa and the pump pressure Pp, therefore, the valving element 42 can be smoothly slid to the pressure introduction conduit 44 to release the closure of the connected portion of the lower return conduit 44 reliably. According to the suspension apparatus 10 of the second embodiment, therefore, it is possible to lower the vehicle height quickly and reliably by the oil discharge from the actuator 11i.

Figure 5:
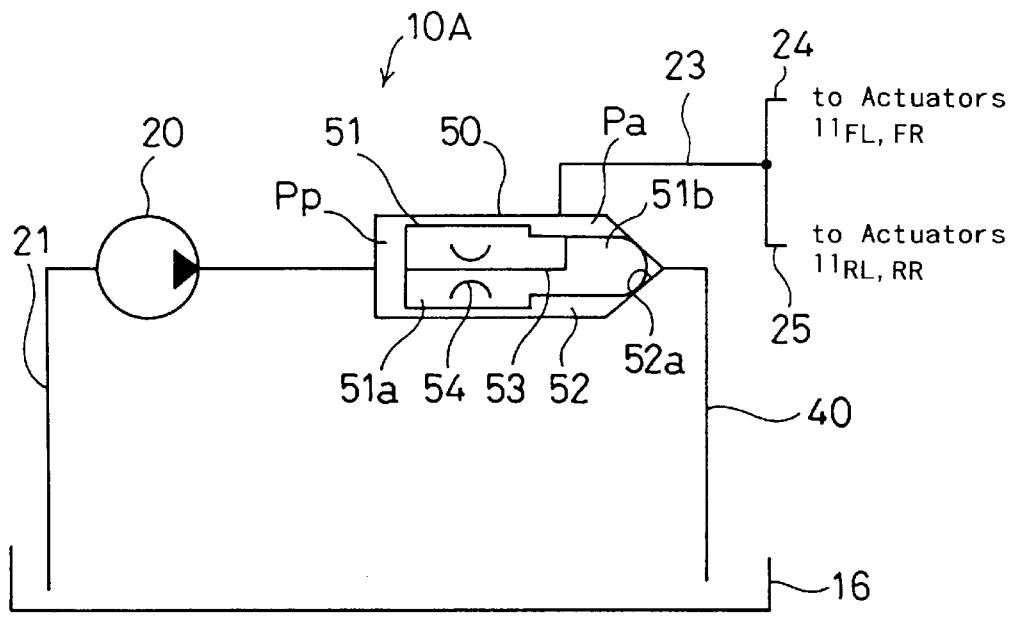
FIG. 5 is a schematic diagram showing a differential pressure valve 50 to be used in place of a first check valve 22 of the first embodiment in a suspension apparatus 10A of a third embodiment.

In a suspension apparatus 10A of a third embodiment, as shown in FIG. 5, a differential pressure valve 50 is directly arranged in the main supply conduit 23 in place of the first check valve 22 of the first embodiment. This differential pressure valve 50 is equipped with a valve chamber 52 which fits a valving element 51 slidably, and the valve chamber 52 is connected at its left end and right end side face to the main supply conduit 23. In the differential pressure valve 50, therefore, the upstream pump pressure Pp and the downstream actuator pressure Pa are received by the valve chamber 52 across the valving element 51. In this differential pressure valve 50, therefore, the valving element 51 is moved in the valve chamber 52 to the right and left in response to the pressure difference between the aforementioned two pressures as in the differential pressure valve 41 of the first embodiment.

In this differential pressure valve 50, too, the right end of the valve chamber 52 is formed into a sloped seat face 52a having a recess which is connected to the return conduit 40. In this embodiment, more specifically, the return conduit 40 is branched from the differential pressure valve 50, as arranged in the main supply conduit 23, to the reserve tank 16. Moreover, the main supply conduit 23 for introducing the actuator pressure Pa into the differential pressure valve 50 is commonly used downstream of the differential pressure valve 50 as a conduit for discharging the oil from the actuator.

The valving element 51 is equipped, like the valving element 42 of the differential pressure valve 41, with a valving element body portion 51a to be exposed to the aforementioned two pressures, and a valving element seal portion 51b having a hemispherical projection at its leading end. The valving element 51 is constructed to close and open the return conduit 40 by the valving element seal portion 51b.

The valving element 51 is further equipped with an internal passage 53, which is formed from the side of the valving element body portion 51a to the valving element seal portion 51b, and a restrictive mechanism 54 which is disposed midway of the internal passage 53 for adding a pressure loss between its upstream and downstream when the oil passes. As a result, the oil, as pumped by the pump 20, is caused to have the substantial pressure loss by the restrictive mechanism 54 while passing via the internal passage 53 in the valving element 51 of the differential pressure valve 50.

While the oil is being pumped from the pump so as to raise the vehicle height, therefore, the actuator pressure Pa is always made lower than the pump pressure Pp by the pressure loss, as caused by the valving element 51 of the differential pressure valve 50. In the differential pressure valve 50 receiving the two pressures, therefore, the valving element 51 is slid rightward by the pressure difference between the two pressures (Pp>Pa) to bring the hemispherical projection at the leading end of the valving element seal portion 51b into abutment against the seat face 52a. As a result, the return conduit 40 is disconnected from the valve chamber 52 so that its passage is closed.

The oil, as pumped from the pump 20, flows via the internal passage 53 of the valving element 51 into the main supply conduit 23 downstream of the differential pressure valve 50 and further into the front wheel supply conduit 24 and the rear wheel supply conduit 25. At each wheel, the corresponding control valve is switched from the one-way communication position to the two-way communication position so that the corresponding actuator 11i is supplied with the oil to raise the vehicle height.

In lowering the vehicle height, on the other hand, when the pump 20 is stopped to lower the pump pressure Pp upstream of the differential pressure valve 50 so that the actuator pressure Pa rises, the valving element 51 of the differential pressure valve 50 is slid leftward by the pressure difference to bring the valving element seal portion 51b apart from the seat face 52a. As a result, the return conduit 40 is released from the closure of its portion connected to the valve chamber 52, so that its passage is opened. The oil, as discharged from the actuator 11i of each wheel, flows via the valve chamber at the side of the valving element seal portion 51b and through the clearance between the seat face 52a and the leading end portion of the valving element seal portion 51b into the return conduit 40 until is recovered by (or discharged into) the reserve tank 16. As a result, the vehicle height is lowered at the wheel corresponding to the actuator 11i which has been discharged of the oil. Incidentally, when the actuator pressure Pa abnormally rises, too, the return conduit 40 is opened as in the case of the differential pressure valve 41 so that the oil is quickly recovered via the return conduit 40 by the reserve tank 16.

Figure 6:
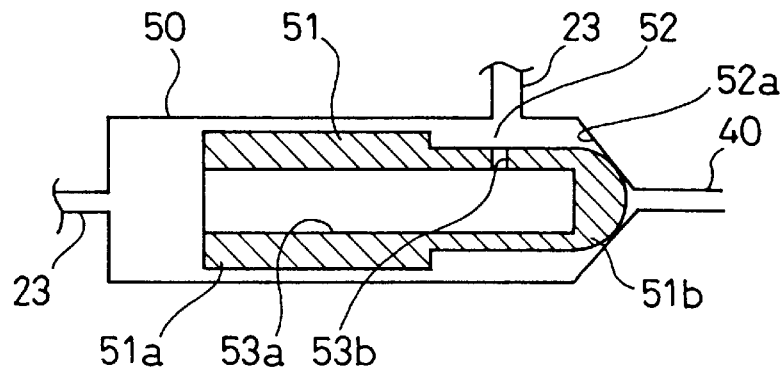
FIG. 6 is a schematic diagram showing the differential pressure valve 50 together with its valving element 51.

In this case, the valving element 51, as will cause the aforementioned pressure loss, can be exemplified by the following construction. As a first example, as shown in FIG. 6, the valving element 51 is equipped with a bottomed first internal passage 53a formed at the central portion thereof, and a second internal passage 53b which is so formed in the valving element seal portion 51b as to allow the first internal passage 53a to communicate with the right end portion of the valve chamber 52. Moreover, the second internal passage 53b is given a smaller diameter whereas the first internal passage 53a is given a larger diameter, so that the second internal passage 53b functions as an orifice to cause the substantial pressure loss when the oil passes. In short, the second internal passage 53b performed together with the first internal passage 53a the function as the restrictive mechanism 54.

Figure 7:
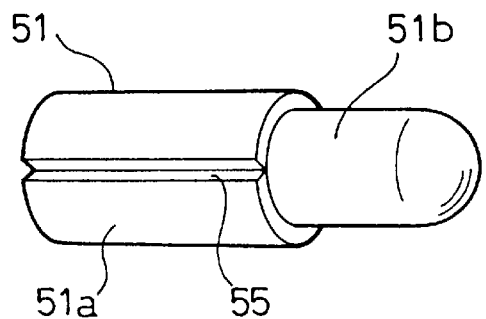
FIG. 7 is a schematic perspective view showing the valving element 51 of the differential pressure valve 50.

In a second example, as shown in FIG. 7, the valving element 51 is equipped with a V-shaped outer groove 55 which is formed axially in the outer surface wall of the valving element body portion 51a. This outer groove 55 is given a smaller sectional area than not only that of the valve chamber 52, but also the effective area of the main supply conduit 23 and a larger length than the groove area so that it functions as a restrictor to cause the substantial pressure loss when the oil passes. In short, this outer groove 55 performed the function as the restrictive mechanism 54. Incidentally, it is quite natural that an (inner groove) corresponding to the outer groove 55 could be formed axially in the inner surface wall of the valve chamber 52.

According to the suspension apparatus 10A of the third embodiment thus far described, the following effects can be achieved in addition to the effects similar to those (i.e., the improvement in the oil discharging rate by reducing the flow resistance in the return conduit and by retaining the discharging flow rate, and the improvement in the rate of lowering the vehicle height) of the suspension apparatus 10 of the first embodiment.

In the suspension apparatus 10A of the third embodiment, the pressure difference for making the valving element 51 of the differential pressure valve 50 responsive can be established by the internal passage 52b (FIG. 6) or the outer groove 55 (FIG. 7) of the valving element 51. According to the suspension apparatus 10A, therefore, the first check valve 22 for establishing such a pressure difference in the main supply conduit 23 as to make the valving element of the differential pressure valve responsive can be dispensed with to simplify the construction and to lower the cost while reducing the size of the system.

Figure 8:
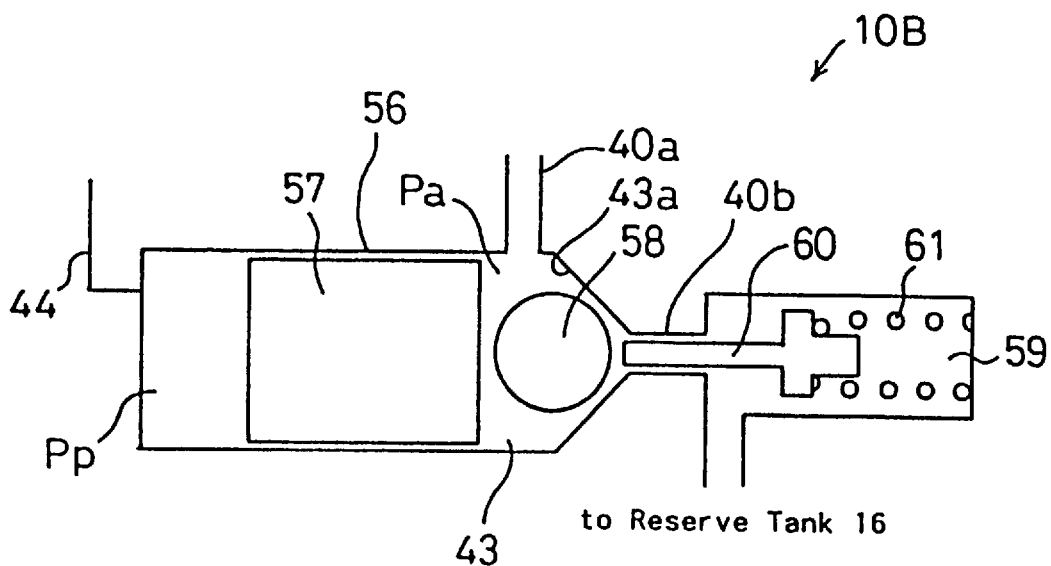
FIG. 8 is a schematic diagram showing a differential pressure valve 56 to be used in place of the differential pressure valve 41 of the first embodiment in a suspension apparatus 10B of a fourth embodiment.

In a suspension apparatus 10B of a fourth embodiment, as shown in FIG. 8, a differential pressure valve 56 is equipped with the valve chamber 43 having the same shape as that of the differential pressure valve 41, and the valve chamber 43 is equipped therein with a first valving element 57 and a second valving element 58. The first valving element 57 is so fitted in the valve chamber 43 as to slide to the right and left, and receives the pump pressure Pp from the pump pressure introduction conduit 44 and the actuator pressure Pa from the upper return conduit 40a. As a result, this first valving element 57 moves to the right and left in response to the pressure difference between those two pressures. On the other hand, the second valving element 58 is made of a ball and is fitted between the first valving element 57 and the seat face 43a. Moreover, this second valving element 58 has its ball diameter determined such that it closes the connected portion of the lower return conduit 40b when it contacts with the seat face 43a.

Midway of the lower return conduit 40b, there is formed a spring accommodating chamber 59 which is located at the conduit extension of the portion connected to the seat face 43a. In this accommodating chamber 59, moreover, there are accommodated a push rod 60 can move to and from the valve chamber 43, and a spring 61 for applying a force to the rod toward the valve chamber 43. Incidentally, the push rod 60 is drawn as a rod having a diameter approximate the internal diameter of the lower return conduit 40b, but is formed into a rod having such a far smaller diameter than the internal diameter of the lower return conduit 40b as to raise no obstruction to the oil passage in the lower return conduit 40b.

Here will be described the controlling supply and discharge of operations of the oil in the suspension apparatus 10B having the aforementioned differential pressure valve 56.

While the oil is being pumped from the pump 20 so as to raise the vehicle height, the pump pressure Pp is greater than the actuator pressure Pa so that the differential pressure valve 56 is caused to slide the first valving element 57 to the right by the pressure difference. As a result, the second valving element 58 is pushed rightward of the ball into abutment against the seat face 43a by the first valving element 57 thereby to close the connected portion of the lower return conduit 40b. The passage of the return conduit 40 is closed at the connected portion of the lower return conduit 40b. At this time, the second valving element 58 pushes the push rod 60 against the urging force of the spring 61.

As a result, the oil, as pumped from the pump 20, flows via the main supply conduit 23 into the front wheel supply conduit 24 and the rear wheel supply conduit 25 (as shown in FIG. 1) so that the vehicle height at each wheel is raised by supplying the oil to the corresponding actuator 11i.

In order to lower the vehicle height, on the other hand, the pump 20 is stopped to lower the pump pressure Pp so that the actuator pressure Pa rises. Then, the differential pressure valve 56 is caused to slide by the pressure difference to slide the first valving element 57 to the left. The second valving element 58 receives not the force for the first valving element 57 but the leftward urging force of the spring 61 through the push rod 60. The second valving clement 58 is forced to leave the seat face 43a so that the closure of the connected portion of the lower return conduit 40b is released to open the passage of the return conduit 40. As a result, the oil, as discharged from the actuator 11i of each wheel, passes via the valve chamber at the side of the second valving element 58 and through the clearance between the seat face 43a and the second valving element 58 into the lower return conduit 40b until it is recovered by (or discharged into) the reserve tank 16. As a result, the vehicle height is lowered at the wheel corresponding to the actuator 11i which has been discharged of the oil. Incidentally, even when the actuator pressure Pa abnormally rises, the passage of the return conduit 40 is opened like the differential pressure valve 41 so that the oil is promptly recovered via the return conduit 40 by the reserve tank 16.

In the case, the load F of the spring 61 is set in the following manner. As described above, the spring 61 is required to have such a set load F that the push rod 60 is pushed to the side of the spring accommodating chamber 59 when the oil is pumped from the pump 20. And, the push rod 60 is pushed to the side of the valve chamber 43 to bring the second valving element 58 apart from the seat face 43a when the oil is discharged from the actuator 11i. This requirement is expressed by the following formula.

$$F<(Pp-Pa)\cdot S1+Pa\cdot S2 \qquad (1)$$

where the pressures Pp and Pa are those at the oil pumping time (or the vehicle height raising time), and Pp>Pa; S1 denotes the pressure receiving area of the second valving element 58; and S2 denotes the seat area of the seat face 43a.

At the oil discharging time (or the vehicle height lowering time) from the actuator 11i, on the other hand, the formula is changed, as follows.

$$F>Pa\cdot S2 \qquad (2)$$

Hence, the spring 61 can reliably bring, if satisfying the above-specified formulas (1) and (2), the second valving element 58 into and out of abutment against the seat face 43a at the time of supplying/discharging the oil.

According to the suspension apparatus 10B of the fourth embodiment thus far described, the following effects can be achieved in addition to the effects similar to those of the suspension apparatus 10 of the first embodiment.

In this suspension apparatus 10B of the fourth embodiment, the first valving element 57 is moved according to the pressure difference between the pump pressure Pp and the actuator pressure Pa, and the connected portion of the lower return conduit 40b of the return conduit 40 is closed and released by the second valving element 58 which is made separate from the first valving element 57. As a result, what is required of the first valving element 57 is the accuracy for sliding to the right and left in the valve chamber 43 in accordance with the pressure difference, ad what is required of the second valving element 58 is the accuracy for coming into abutment against the seat face 43a to close the connected portion, so that no alignment is required between these two valving elements. Thus, according to this suspension apparatus 10B of the fourth embodiment, the machining and assembling accuracy of the first valving element 57 and the second valving element 58 can be simplified to facilitate the machining and assembling steps and to reduce the cost of the system.

According to this suspension apparatus 10B of the fourth embodiment, moreover, when the oil is discharged from the actuator 11i for lowering the vehicle height, the second valving element 58 is forced to leave the seat face 43a by the urging force of the spring 61 thereby to release the closure of the connected portion of the lower return conduit 40b of the return conduit 40 without fail. As a result, the oil is quickly and reliably discharged from the actuator 11i of each wheel so that the vehicle height can naturally be quickly lowered to improve the height lowering reliability.

Figure 9:
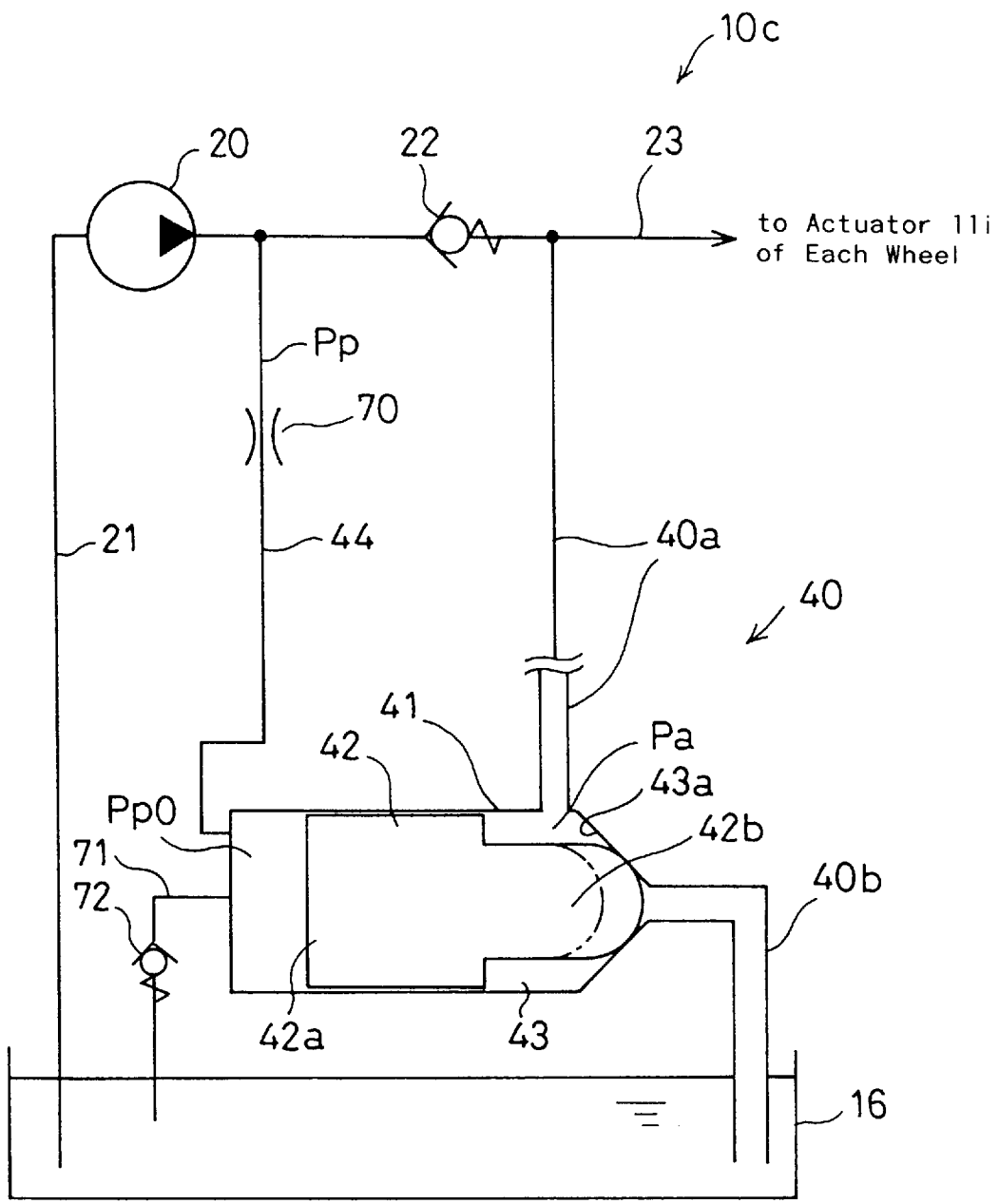
FIG. 9 is an enlarged schematic diagram showing an essential portion around the differential pressure valve 41 of a fluid circuit of a suspension apparatus 10C of a fifth embodiment.

Here will be described a suspension apparatus 10C of a fifth embodiment. This suspension apparatus 10C is equipped as shown in FIG. 9, with the differential pressure valve 41 of the suspension apparatus 10 of the first embodiment, and an orifice 70 which is disposed midway of the pump pressure introduction conduit 44 of the differential pressure valve 41 to receive the pump pressure Pp. As a result, the differential pressure valve 41 is caused by the pressure loss caused by the orifice 70 to receive a pump pressure Pp0 slightly lower than the pump pressure Pp downstream of the pump 20. In this case, the orifice 70 is so designed that the pump pressure Pp0 is higher than the actuator pressure Pa when the pump pressure Pp and the actuator pressure Pa are within a normal pressure range.

When the pump pressure Pp and the actuator pressure Pa are within the standard pressure range, the differential pressure valve 41 acts as in the first embodiment. Specifically, while the oil is being pumped from the pump 20 so as to raise the vehicle height, Pp>Pp0>Pa, as described above, so that valving element 42 is caused to slide to the right by the pressure different. The valving element seal portion 42b comes into abutment against the seat face 43a to close the connected portion of the lower return conduit 40b. As a result, the passage of the return conduit 40 is closed at the connected portion of the lower return conduit 40b so that the oil is supplied (as shown in FIG. 1) from the pump 20 via the conduits such as the main supply conduit 23 to the actuator 11i of each wheel so that the vehicle height is raised at each wheel.

When the pump 20 is stopped to lower the vehicle height so that the pump pressure Pp and the pump pressure Pp0 are lowered whereas the actuator pressure Pa is raised (Pa>Pp0>Pp), on the other hand the valving element 42 is caused to slide to the left by the pressure difference. The valving element seal portion 42b leaves the seat face 43a to open the connected portion of the lower return conduit 40b so that the passage of the return conduit 40 is opened. As a result, the oil, as discharged from the actuator 11i of each wheel, flows through the valve chamber at the side of the valving element seal portion 42b into the lower return conduit 40b until it is recovered by (or discharged into) the reserve tank 16. As a result, the vehicle height is lowered at the wheel corresponding to the actuator 11i which has bene discharged of the oil. Incidentally, when the actuator pressure Pa abnormally rises, the passage of the return conduit 40 is opened, as described above, so that the oil is quickly recovered via the return conduit 40 by the reserve tank 16.

In addition, the suspension apparatus 10C is equipped with an upper release conduit 71 which is arranged from the left-hand end of the valve chamber 43 to the reserve tank 16 and has connected with the pump pressure introduction conduit 44 via the valve chamber 43. This upper release conduit 71 is equipped with a relief valve 72. Incidentally, this upper release conduit 71 may connect directly with the pump pressure introduction conduit 44 downstream of the orifice 70.

The upper release conduit 71 releases the oil, as having passed through the orifice 70 in the pump pressure introduction conduit 44, into the reserve tank 16 when the relief valve 72 is opened. The relief valve 72 is constructed such that it opens the passage of the upper release conduit 71 when its upstream pressure, i.e., the pump pressure Pp0 exceeds the upper limit of the normal pressure range of the actuator pressure Pa. In this case, the excess of the pump pressure Pp0 over the aforementioned upper limit implies that the pump pressure Pp by the pump 20 is abnormally raised by some cause over the upper limit of the normal pressure range. At this time, the actuator pressure Pa exceeds the upper limit of the normal pressure range. The pressure of the relief valve 72 for closing the passage that is, the pressure for the relief valve 72 to close the passage once it relieved it, is lower than the pressure for relieving the passage. As a result, when the passage is opened by the relief valve 72, the passage is retained in the opened state for a predetermined time period.

According to the suspension apparatus 10C of the fifth embodiment thus far described, the following effects can be achieved in addition to the effects similar to those of the suspension apparatus 10 of the first embodiment.

When the pump pressure Pp by the pump 20 exceeds the upper limit of its normal pressure range, as described above, the relief valve 72 responds to the rise in the pump pressure Pp0 to open the passage of the upper release conduit 71. From this upper release conduit 71, therefore, no only the oil in its passage but also the oil in the valve chamber 43 at the side of the pump pressure introduction conduit 44 and the oil in the passage downstream of the orifice 70 in the pump pressure introduction conduit 44 are released to the reserve tank 16. As result of these oil releases, the oil pressure (i.e., the pump pressure Pp0) in the valve chamber 43 at the side of the pump pressure introduction conduct 44 considerably drops. Incidentally, the oil, as pumped from the pump 20, flows into the pump pressure introduction conduit 44 downstream of the orifice 70, but at a restricted rate because it is throttled by the orifice 70, so that the pump pressure Pp0 is not kept as it is at the level before the opening of the upper release conduit 71. Since the upper release conduit 71 is independent of the passage downstream of the first check valve 22, on the other hand, the actuator pressure Pa is not influenced by the opening of the passage of the upper release conduit 71, but is left at the level over the upper limit of the normal pressure range, as raised with the rise in the pump press Pp.

The differential pressure valve 41 receives both the lowered pump pressure Pp0 and the not-lowered actuator pressure Pa (Pa>Pp0) so that the valving element 42 is caused to slide to the left by the pressure difference. As a result, the valving element seal protein 42b leaves the seat face 43a to release the closure of the connected portion of the lower return conduit 40b so that the passage of the return conduit 40 is opened. From the actuator 11i of each wheel, therefore, the oil discharges through the valve chamber at the side of the valving element seal portion 42b into the lower return conduit 40b until it is recovered by (or discharged into) the reserve tank 16. In the actuator 11i which has been discharged of the oil, therefore, the actuator pressure Pa is lowered by the oil discharge form the actuator pressure Pa which has been higher than the upper limit of the normal pressure range. The oil discharge of this case from actuator 11i is quickly effected because it receives no flow resistance while the oil is passing through the return conduit 40. Moreover, the discharge flow rate of the oil could be increased by widening the passage the a portion from the upper return conduit 40a to the lower return conduct 40b.

According to this suspension apparatus 10C of the fifth embodiment, therefore, even if the pump pressure Pp of the oil from the pump 20 abnormally rises, the actuator pressure Pa, as accordingly raised, can be abruptly lowered by discharging the oil promptly at a high flow rate. As a result, it is possible to avoid reliably and quickly the troubles, as might otherwise be caused by the abnormal rise in the pump pressure Pp or the actuator pressure Pa, such as the leakage of the oil form the passages, the excessive load upon the pump 20, or an unexpected rise in the vehicle height.

In this case, when the pump pressure Pp from the pump 20 restores a level in its normal pressure range, the relief valve 72 closes the passage of the upper release conduit 71. As a result, the differential pressure valve 41 receives the pump pressure Pp0, as restored according to the restoration of the pump pressure Pp, and the actuator pressure Pa, as lowered, (Pp>Pp0>Pa), to that its valving element 42 is slide to the right by the pressure difference to close the connected portion of the lower return conduit 40b by the valving element seal portion 42b. After the restoration of the pump pressure Pp, therefore, the oil is supplied form the pump 20 via the main supply conduct 23 to the actuator 11i of each wheel so that the actuator pressure Pa quickly restores a level within its normal pressure range. As a result, the vehicle height can quickly restores it original value.

Figure 11:
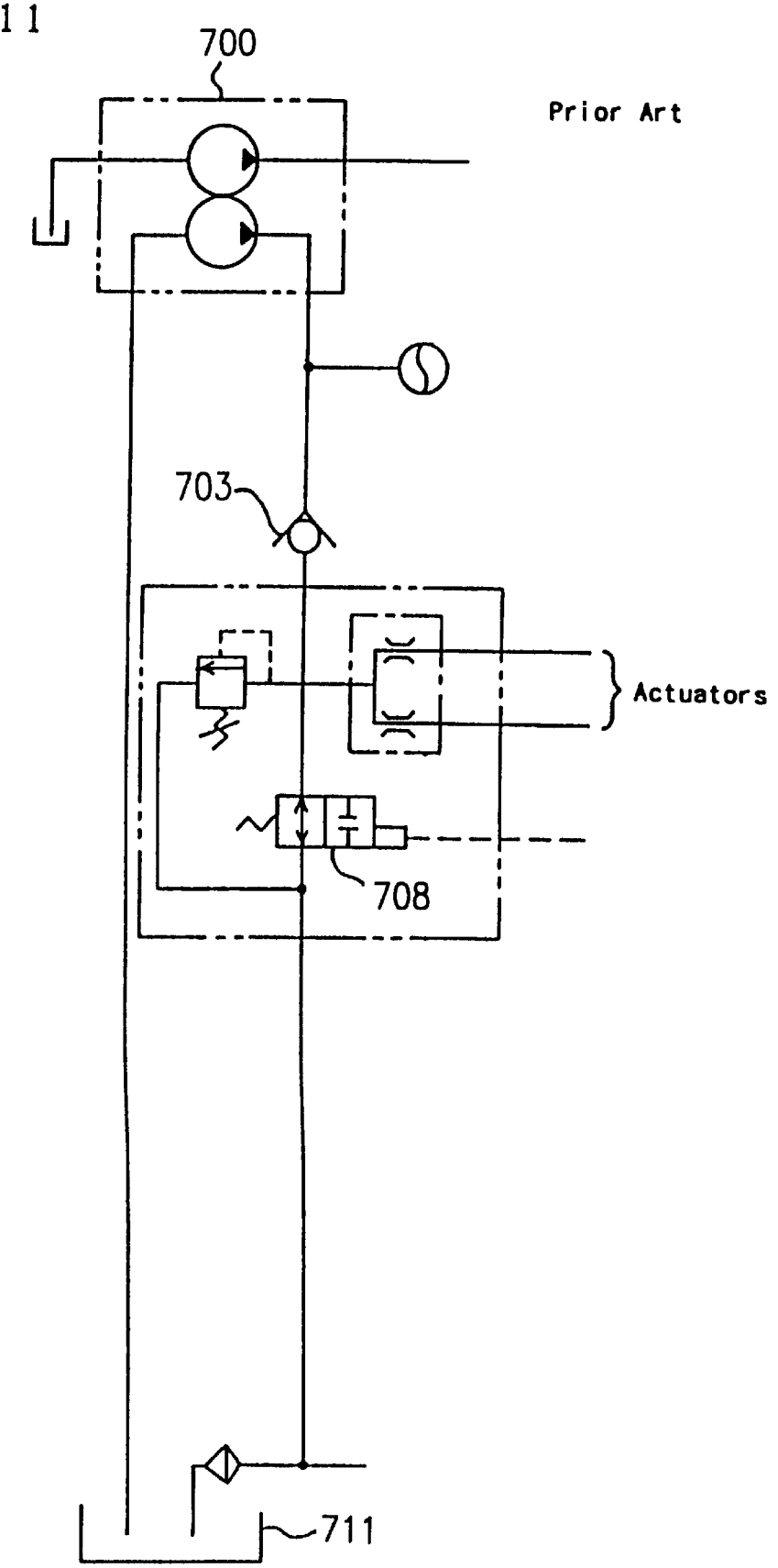
FIG. 11 is a schematic diagram showing an essential portion of a construction of a fluid circuit of conventional suspension apparatus.

In JAPANESE PATENT LAYING-OPEN GAZETTE No. 4-108023, there has been proposed a conventional suspension apparatus of the type, in which the actuator pressure Pa, as abnormally raised with the abnormal rise in the pump pressure Pp, is lowered by discharging the oil from the actuator 11i, as in the aforementioned suspension apparatus 10C of the fifth embodiment. As shown in FIG. 11, more specifically, the circuit at the side of the actuator is equipped with a relief valve for receiving the actuator pressure Pa so that the oil is discharged by the relief valve from the actuator of the reserve tank when the actuator pressure Pa rises. In this suspension apparatus of the prior art, however, the oil, as discharged from the actuator, receives the flow resistance while it is passing through an orifice in the relief valve. In this conventional suspension apparatus, therefore, the actuator pressure Pa is lowered only gradually because of the low release rate and the low flow rate. On the contrary, the suspension apparatus 10C of the fifth embodiment has an advantage that the actuator pressure Pa can be promptly lowered, as described above.

Figure 10:
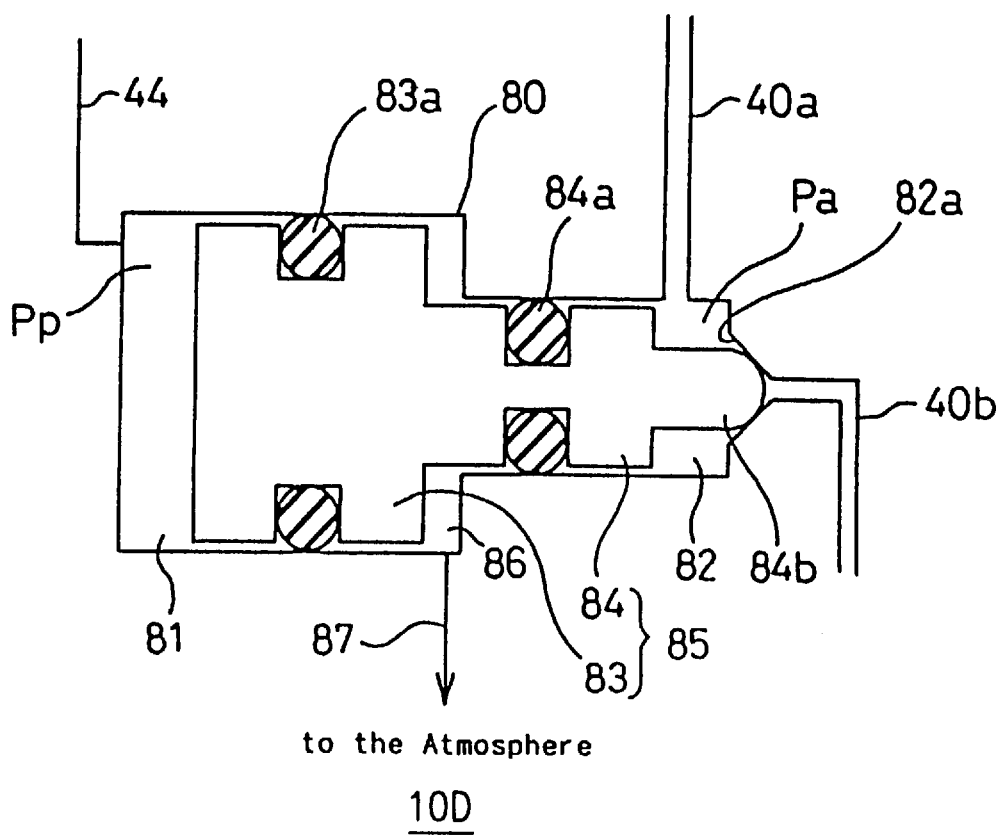
FIG. 10 is a schematic diagram showing a construction of a differential pressure valve 80 to be used in place of the differential pressure valve 41 of the first embodiment in a suspension apparatus 10D of a sixth embodiment.

Here will be described a suspension apparatus 10D of a sixth embodiment. This suspension apparatus 10D is equipped with a differential pressure valve 80, as shown in FIG. 10, in place of the differential pressure valve 41 of the suspension apparatus 10. The differential pressure valve 80 is equipped with a first valve chamber 81 connected to the pump pressure introduction conduit 44, and a second valve chamber 82 connected to the upper return conduit 40a but, having a smaller sectional area than that of the first valve chamber 81. These first and second valve chambers constitute a valve chamber of the entirety of the differential pressure valve. In the differential pressure valve 80, moreover, the first valve chamber 81 having a larger pressure receiving area receives the pump pressure Pp from the pump pressure introduction conduit 44, and the second chamber 82 having a smaller pressure receiving area than that of the first valve chamber 81 receives the actuator pressure Pa form the upper return conduit 40a.

The right-hand end of the second valve chamber 82 is formed, as in the differential valve 41, into a sloped seat face 82a and is connected at its recess to the lower return conduit 40b. In the differential pressure valve 80, moreover, a first valving element portion 83 is slidably fitted in the first valve chamber 81, and as second valving element portion 84 is slidably fitted in the second valve chambers 82. The two valve chamber portions 83 and 84 constitute a valving element 85 a result, the pump pressure Pp acts upon the first valving element portion 83, and the actuator pressure Pa acts upon the second valving element portion 84.

The first valving element portion 83 and the second valving element portion 84 are equipped on their respective outer circumferences with O-rings 83a and 84a so that the first valve chamber 81 and the second valve chamber 82 are made water-right. As a result, the first valving element portion 83 and the second valving element portion 84 slide water-tight in their respective chamber.

The second valving element protein 84 is equipped at the side of the seat face 82a with a valving element seal protein 84b having a hemispherical projection at its leading end. Moreover, this second valving element portion 84 closes the connected portion for the lower return conduit 40b by bringing the projection of the valving element seal protein 84b into abutment against the seat face 82a.

In the differential pressure valve 80, moreover, an air vent conduit 87, as vented to the atmosphere, is connected to a joint portion 86 between the first valve chamber 81 and the second valve chamber 82, so that the joint portion 86 is vented to the atmosphere.

The differential pressure valve 80 thus constructed receives the two pressures, that is, the pump pressure Pp of the oil from the pump 20 and the actuator pressure Pa across the valving element 85 so that the pressure difference causes the valving element 85 to close and open the connected portion of the lower return conduit 40b.

While the oil is being pumped from the pump 20 so as to raise the vehicle height, the pump pressure Pp is made higher than the actuator pressure Pa by the pressure loss caused by the first check valve 22 (as shown in FIG. 1). In response to these two pressure, therefore, the valving element 85 is caused to slide to the right by the pressure difference. At this time, the first valving element portion 83 received the higher pump pressure Pp at the side of the first valve chamber 81 having the larger pressure receiving area, and the second valving element portion 84 receives the lower actuator pressure Pa at the side of the second valving element 82 having the smaller pressure receiving area. As a result, the differential pressure valve 80 slides the valving element 85 by a strong force from the side of the first valve chamber a to the side of the second valve chamber 82. In the joint portion 86 which has its capacity decreased by the rightward sliding motion of the valving element 85, moreover, the inside air is released to the atmosphere via the air vent conduit 87 so that the rightward sliding motion for the valving element 85 is not blocked.

As a result, the valving element 85 receives the strong force to slide smoothly to the right so that the projection at the leading end of the valving element seal portion 84b of the second valving element portion 84 comes into abutment against the seat face 82a. According to the suspension apparatus 10D having the differential pressure valve 80, therefore, the connected portion of the lower return conduit 40b can be reliably closed to raise the vehicle height, as described above, and no special load is preferably exerted upon the pump 20 for sliding the valving element 85.

When the pump 20 is stopped to lower the pump pressure Pp so as to lower the vehicle height so that the oil is discharged from the actuator 11i (Pa>Pp), on the other hand, the differential pressure valve 80 receives the higher actuator pressure Pa at its valving element 85 even at the side of the second valve chamber 82 having the smaller pressure receiving area, so that its valving element 85 is slide to the side of the first valve chamber 81. At this time, the joint portion 86, the capacity of which is increased by the leftward sliding motion of the valving element 85, is supplied therein with the air via the air vent conduit 87 so that it will not block the leftward sliding motion of the valving element 85. As a result, the valving element 85 smoothly slides to the left to bring the projection at the leading end of the valving element seal portion 84b away from the seat face 82a. According to the suspension apparatus 10D having the differential pressure valve 80, therefore, the closure of the connected portion of the lower return conduit 40b can be reliably discharged to lower the vehicle height quickly, as described above.

Although the embodiments of the present invention have been described above, it should not be limited in the least to the aforementioned embodiments or modes of embodiment but can naturally be practiced in various modes without parting from the gist thereof. For example, the constructions of the conduits to the actuator 11i of each wheel downstream of the first check valve 22 are arbitrary, and the present invention can be applied to the suspension apparatus, in which the actuators 11i (e.g., the actuator 11FL and the actuator 11FR, and the actuator 11RL and the actuator 11RR) of the left-hand/right-hand and front/rear wheels are connected to each other.

It is also possible to take a configuration in which the orifice is arranged in the main supply conduit 23 in place of the first check valve 22. In this modification, a pressure difference occurs between the upstream and downstream of the orifice when he oil passes through the orifice, so that the differential pressure valve 41 and so on can be driven, as described above. Moreover, the first and second front wheel control valve 26 and 126 and the rear wheel control valves 28 and 128 can naturally be exemplified by the control valves which take the position for completely blocking the conduits and the two-way communications positions. In addition, the present invention can naturally be applied to a system other than the suspension apparatus if the system extends/contracts the actuators by controlling supply and discharge of the oil (or the working fluid) to the actuators.

It should be clearly understood that the above embodiments are only illustrative and not restrictive in any sense. The scope and spirit of the presentation invention are limit only by the terms of the appended claims.

What is claimed is:

1. An actuator drive system for extending and contracting an actuator by controlling supply and discharge of a working fluid to and from said actuator, comprising:

a fluid source for pumping the working fluid;

a supply conduit for supplying the working fluid from said fluid source to said actuator;

a return conduit for discharging the working fluid discharged from said actuator; and a differential pressure valve including a valve chamber and a valving element slidably fit in said valve chamber, said differential pressure valve being receptive of a pump pressure from said fluid source supplied by said supply conduit and an actuator pressure from said actuator supplied by said return conduit so that said valving element in said valve chamber may be moved responsive to a pressure difference between said pump pressure and said actuator pressure across said valving element, wherein said return conduit includes: a first conduit portion for introducing the working fluid discharged from said actuator into said valve chamber so that said actuator pressure may be received by said valving element; and a second conduit portion connected said valve chamber for discharging the working fluid, which passed through said first conduit portion via said valve chamber, and wherein said valving element is moved in said valve chamber responsive to said pressure difference to close said second conduit portion of said return conduit, while the working fluid is being pumped from said fluid source through said supply conduit to said actuator, and to release the closure of said second conduit connected portion while the working fluid is being discharged from said actuator through said return conduit.

2. An actuator drive system for extending and contracting an actuator by controlling supply and discharge of a working fluid to and from said actuator, comprising:

a fluid source for pumping the working fluid;

a first conduit connected to the actuator for conveying the working fluid to and from said actuator;

a second conduit connected to said fluid source, said second conduit also being connected to said first conduit through a connection path;

a differential pressure valve including a valve chamber and a valving element slidably fit in said valve chamber, said differential pressure valve being receptive of a pump pressure from said second conduit at a first side of said valving element in said valve chamber and being receptive of an actuator pressure of a side of said actuator from said first conduit at a second side of said valving element in said valve chamber so that said valving element is moved responsive to a pressure difference between said pump pressure and said actuator pressure across said valving element, and a third conduit connected to said valve chamber at said second side of said valving element for conveying the working fluid discharged from said actuator, wherein said valving element is moved in said valve chamber responsive to said pressure difference to close said third conduit while the working fluid is being pumped from said fluid source through said second conduit, said connection path and first conduit to said actuator, and to open said third conduit while the working fluid is being discharged from said actuator through said first conduit.

3. An actuator drive system according to claim 2, further comprising:

internal valve passages, as said connection path, connected between said first and second conduits.

4. An actuator drive system according to claim 2, wherein said differential pressure valve includes passing means as said connection path for passing the working fluid through said valving element and said valve chamber from said second conduit to said first conduit, while the working fluid is being pumped from said fluid source, and for adding a pressure loss while the working fluid pumped from said fluid source is flowing out of said valve chamber.

5. An actuator drive system according to claim 4, wherein the passing means comprises an in-valve path having a restrictive mechanism that adds a pressure loss while the working fluid is flowing into said valve chamber from said second conduit passing through said in-valve path, and allows the working fluid to pass through said in-valve path.

6. An actuator drive system according to claim 2, wherein said third conduit is connected to an end portion of said valve chamber at said second side, wherein said valve chamber includes a seat face formed with a slope at a connected portion of said third conduit and having an opening open to said third conduit, and wherein said valving element includes:

a first valving portion so movably fitted in said valve chamber as to move in said valve chamber responsive to said pressure difference; and a second valving portion having a spherical shape and arranged between said first valving portion and said seat face for closing said opening when said second valving portion contacts with said seat face.

7. An actuator drive system according to claim 6, wherein said differential pressure valve includes means for applying a force to said second valving portion away from said seat face.

8. An actuator drive system according to claim 2, further comprising:

a fourth conduit connected to said valve chamber at said first side of said valving element for discharging the working fluid from said valve chamber;

a restrictor arranged in said second conduit; and relief means arranged in said fourth conduit for opening the fourth conduit when the pressure of the working fluid passing through said fourth conduit exceeds a predetermined level.

9. An actuator drive system according to claim 2, wherein said valving element comprises a first portion for receiving said pump pressure and a second portion for receiving said actuator pressure, said second portion having a pressure receiving area smaller than that of said first portion; and wherein said valve chamber comprises a first liquid-tight sub-chamber for housing said first portion, a second liquid-tight sub-chamber for housing said second portion, and a third liquid-tight sub-chamber formed between said first and second sub-chambers, said third sub-chamber being separated from said first and second sub-chambers by said first and second portions and vented to the atmosphere.

10. A suspension apparatus for interposing actuators between a vehicle body and respective wheels for suspending said vehicle body and adjusting a vehicle height by extending and contracting said actuators through the supply and discharge of a working fluid to and from said actuators, said suspension apparatus comprising:

a fluid source for pumping the working fluid;

a supply conduit for supplying the working fluid from said fluid source to said actuators;

a return conduit for discharging the working fluid discharged from said actuators; and a differential pressure valve including a valve chamber and a valving element slidably fit in said valve chamber, said differential pressure valve being receptive of a pump pressure from said fluid source supplied by said supply conduit and an actuator pressure from said actuators supplied by said return conduit so that said valving element in said valve chamber may be moved by a pressure difference between said pump pressure and said actuator pressure across said valving element, wherein said return conduit includes: a first conduit portion for introducing the working fluid discharged from said actuators into said valve chamber so that said actuator pressure may be received by said valving element; a second conduit portion connected to said valve chamber for discharging the working fluid, which passed through said first conduit portion via said valve chamber, and wherein said valving element is moved in said valve chamber responsive to said pressure difference to close said second conduit portion of said return conduit, while the working fluid is being pumped from said fluid source through said supply conduit to said actuators, and to release the closure of said second conduit portion while the working fluid is being discharged from said actuators through said return conduit.

11. A suspension apparatus for interposing actuators between a vehicle body and respective wheels for suspending said vehicle body and adjusting a vehicle height by extending and contracting said actuators through the supply and discharge of a working fluid to and from actuators, said suspension apparatus comprising:

a fluid source for pumping the working fluid;

a first conduit connected to the actuators for conveying the working fluid to and from said actuators;

a second conduit connected to said fluid source, said second conduit also being connected to said first conduit through a connection path;

a differential pressure valve including a valve chamber and a valving element slidably fit in said valve chamber, said differential pressure valve being receptive of a pump pressure from said second conduit at a first side of said valving element in said valve chamber and being receptive of an actuator pressure of a side of said actuators from said first conduit at a second side of said valving element in said valve chamber so that said valving element is moved responsive to a pressure difference between said pump pressure and said actuator pressure across said valving element, and a third conduit connected to said valve chamber at said second side of said valving element for conveying the working fluid discharged from said actuators, wherein said valving element is moved in said valve chamber responsive to said pressure difference to close said third conduit while the working fluid is being pumped from said fluid source through said second conduit said connection path and first conduit to said actuators, and to open said third conduit while the working fluid is being discharged from said actuators through said first conduit.

12. A suspension apparatus according to claim 11, further comprising:

internal valve passages, as said connection path, connected between said first and second conduits.

13. A suspension apparatus according to claim 11, wherein said differential pressure valve includes passing means as said connection path for passing the working fluid through said valving element and said valve chamber from said second conduit to said first conduit, while the working fluid is being pumped from said fluid source, and for adding a pressure loss while the working fluid pumped from said fluid source is flowing out of said valve chamber.

14. A suspension apparatus according to claim 13, wherein the passing means comprises an in-valve path having a restrictive mechanism that adds a pressure loss while the working fluid is flowing into said valve chamber from said second conduit passing through said in-valve path, and allows the working fluid to pass through said in-valve path.

15. A suspension apparatus according to claim 11, wherein said third conduit is connected to an end portion of said valve chamber at said second side, wherein said valve chamber includes a seat face formed with a slope at a connected portion of said third conduit and having an opening open to said third conduit, and wherein said valving element includes:
a first valving portion so movably fitted in said valve chamber as to move in said valve chamber responsive to said pressure difference; and
a second valving portion having a spherical shape and arranged between said first valving portion and said seat face for closing said opening when said second valving portion contacts with said seat face.

16. A suspension apparatus according to claim 15, wherein said differential pressure valve includes means for applying a force to said second valving portion away from said seat face.

17. A suspension apparatus according to claim 11, further comprising:

a fourth conduit connected to said valve chamber at said first side of said valving element for discharging the working fluid from said valve chamber;

a restrictor arranged in said second conduit; and relief means arranged in said fourth conduit for opening the fourth conduit [same] when the pressure of the working fluid passing through said fourth conduit exceeds a predetermined level.

18. A suspension apparatus according to claim 11, wherein said valving element comprises a first portion for receiving said pump pressure and a second portion for receiving said actuator pressure, said second portion having a pressure receiving area smaller than that of said first portion; and wherein said valve chamber comprises a first liquid-tight sub-chamber housing said first portion, a second liquid-tight sub-chamber for housing said second portion, and a third liquid-tight sub-chamber formed between said first and second sub-chambers, said third sub-chamber being separated from said first and second sub-chambers by said first and second portions and vented to the atmosphere.

* * * * *

UNITED STATES PATENT AND TRADEMARK OFFICE
CERTIFICATE OF CORRECTION

PATENT NO. : 5,865,453
DATED : February 2, 1999
INVENTOR(S) : Kenji Harada, et. al.

It is certified that error appears in the above-indentified patent and that said Letters Patent is hereby corrected as shown below:

| Column | Line | |
|---|---|---|
| 11 | 65 | Change "restores" to --restore--. |
| 25 | 37 | Change "no" to --not--. |
| 26 | 9 | After "passage" insert --of--. |
| 26 | 35 | Change "restores it" to --restore its--. |
| 28 | 54 | Change "are limit" to --are limited--. |
| 29 | 12 | After "connected" insert --to--. |

Signed and Sealed this

Sixteenth Day of November, 1999

Attest:

Q. TODD DICKINSON

*Attesting Officer*   *Acting Commissioner of Patents and Trademarks*